United States Patent
Park et al.

(10) Patent No.: US 11,039,311 B2
(45) Date of Patent: *Jun. 15, 2021

(54) PROFILE DOWNLOAD METHOD AND APPARATUS FOR USE IN WIRELESS COMMUNICATION SYSTEM

(71) Applicant: Samsung Electronics Co., Ltd., Suwon-si (KR)

(72) Inventors: Jonghan Park, Bucheon-si (KR); Duckey Lee, Seoul (KR); Hyewon Lee, Seoul (KR); Sangsoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,327

(22) Filed: Jul. 29, 2019

(65) Prior Publication Data

US 2019/0357046 A1 Nov. 21, 2019

Related U.S. Application Data

(63) Continuation of application No. 15/523,803, filed on Aug. 31, 2016, now Pat. No. 10,368,240.
(Continued)

(51) Int. Cl.
*H04L 29/06* (2006.01)
*H04W 12/06* (2021.01)
(Continued)

(52) U.S. Cl.
CPC .......... *H04W 12/06* (2013.01); *H04L 9/3239* (2013.01); *H04L 9/3273* (2013.01);
(Continued)

(58) Field of Classification Search
CPC . H04W 12/06; H04W 12/0023; H04W 8/205; H04W 4/50; H04W 4/60;
(Continued)

(56) References Cited

U.S. PATENT DOCUMENTS

| 5,297,206 A | 3/1994 | Orton |
| 8,146,142 B2 * | 3/2012 | Lortz ..................... H04L 63/04 726/6 |

(Continued)

FOREIGN PATENT DOCUMENTS

| CN | 1567294 A | 1/2005 |
| CN | 1811813 A | 8/2006 |

(Continued)

OTHER PUBLICATIONS

Foreign Communication From a Related Counterpart Application, PCT Application No. PCT/KR2016/009725, International Search Report dated Nov. 24, 2016, 3 pages.
(Continued)

*Primary Examiner* — Brandon A Hoffman
*Assistant Examiner* — Nega Woldemariam

(57) ABSTRACT

A profile downloading method and apparatus is provided for a terminal to download and install a profile in a communication system. The communication method of the terminal includes transmitting a first message including information on a profile to be received from a profile provision server; receiving a second message including information indicating whether an encryption code input is required and a first modified encryption code; generating, when the first modified encryption code is successfully authenticated, a second modified encryption code; transmitting to the profile provision server a third message including information requesting to the profile provision server for the second modified encryption code and profile download, and receiving a
(Continued)

fourth message including information on the profile from the profile provision server.

20 Claims, 16 Drawing Sheets

Related U.S. Application Data

(60) Provisional application No. 62/212,387, filed on Aug. 31, 2015.

(51) Int. Cl.
| | |
|---|---|
| *H04W 4/50* | (2018.01) |
| *H04W 4/60* | (2018.01) |
| *H04L 9/32* | (2006.01) |
| *H04W 8/20* | (2009.01) |
| *H04W 12/30* | (2021.01) |

(52) U.S. Cl.
CPC ........... *H04L 63/0869* (2013.01); *H04W 4/50* (2018.02); *H04W 4/60* (2018.02); *H04W 8/205* (2013.01); *H04W 12/35* (2021.01)

(58) Field of Classification Search
CPC . H04L 9/3239; H04L 9/3273; H04L 63/0869; H04L 9/0869; H04L 9/3226; H04L 9/3236; H04L 67/30
USPC ......................................................... 713/168
See application file for complete search history.

(56) References Cited

U.S. PATENT DOCUMENTS

| | | | | |
|---|---|---|---|---|
| 9,009,475 | B2* | 4/2015 | Hauck | H04L 63/06 |
| | | | | 713/168 |
| 2006/0031493 | A1 | 2/2006 | Cugi | |
| 2008/0016230 | A1* | 1/2008 | Holtmanns | H04L 9/3226 |
| | | | | 709/229 |
| 2011/0302574 | A1 | 12/2011 | Yoshikawa | |
| 2012/0190354 | A1* | 7/2012 | Merrien | H04L 63/083 |
| | | | | 455/422.1 |
| 2012/0196569 | A1 | 8/2012 | Holtmanns et al. | |
| 2012/0311330 | A1* | 12/2012 | Zhang | H04W 12/0608 |
| | | | | 713/168 |
| 2013/0122864 | A1* | 5/2013 | Haggerty | G06F 21/34 |
| | | | | 455/411 |
| 2014/0140507 | A1* | 5/2014 | Park | H04L 63/0853 |
| | | | | 380/247 |
| 2014/0219448 | A1* | 8/2014 | Froels | H04L 9/14 |
| | | | | 380/255 |
| 2014/0287725 | A1* | 9/2014 | Lee | H04L 63/0853 |
| | | | | 455/411 |
| 2014/0289366 | A1 | 9/2014 | Choi et al. | |
| 2015/0143125 | A1* | 5/2015 | Nix | H04L 9/0841 |
| | | | | 713/171 |
| 2015/0163056 | A1* | 6/2015 | Nix | H04W 12/0023 |
| | | | | 380/46 |
| 2015/0180847 | A1 | 6/2015 | Nix | |
| 2015/0332261 | A1 | 11/2015 | Park et al. | |
| 2016/0088096 | A1* | 3/2016 | Quiriconi | H04L 67/34 |
| | | | | 709/219 |
| 2016/0127132 | A1 | 5/2016 | Lee et al. | |
| 2016/0142906 | A1* | 5/2016 | Park | H04L 67/42 |
| | | | | 455/419 |
| 2016/0182519 | A1 | 6/2016 | Gulbrandsen | |

FOREIGN PATENT DOCUMENTS

| | | |
|---|---|---|
| CN | 1993963 A | 7/2007 |
| CN | 103259663 A | 8/2013 |
| CN | 103339974 A | 10/2013 |
| KR | 10-0499122 B1 | 7/2005 |
| KR | 10-1330867 B1 | 11/2013 |
| KR | 10-2014-0140820 A | 12/2014 |
| WO | 2015002545 A1 | 1/2015 |

OTHER PUBLICATIONS

Supplementary European Search Report dated Aug. 2, 2018 in connection with European Patent Application No. 16 84 2286, 7 pages.
Wikipedia, "Public key certificate", Aug. 20, 2015, 8 pages.
The First Office Action in connection with Chinese Application No. 201680052315.8 dated Aug. 28, 2020, 22 pages.
Examination report in connection with Indian Application No. 201837007294 dated Nov. 13, 2020, 7 pages.
GSM Association, "Embedded SIM Remote Provisioning Architecture," Version 1.1, Dec. 17, 2013, 84 pages.
Gold Wall Press, Information Security Professional Committee of China Computer Federation "Collected Papers of the 19th National Information Security Academic Conference (IS2009)," Sep. 30, 2009, 9 pages, (English summary).
Notice of Allowance dated Mar. 24, 2021 in connection with Chinese Patent Application No. 201680052315.8, 5 pages.

\* cited by examiner

PROFILE DOWNLOAD METHOD AND APPARATUS FOR USE IN WIRELESS COMMUNICATION SYSTEM

CROSS-REFERENCE TO RELATED APPLICATIONS

This application is a continuation of U.S. patent application Ser. No. 15/253,803 file on Aug. 31, 2016, which claims the benefit under 35 U.S.C. § 119(e) of U.S. Provisional Patent Application No. 62/212,387 filed on Aug. 31, 2015, the disclosures of which are herein incorporated by reference in their entirety.

BACKGROUND

1. Field

The present invention relates to a communication system and, in particular, to a profile downloading method and apparatus of a terminal in order for the terminal to download and install a profile in real time in a communication system.

2. Description of Related Art

In order to meet the increasing demand for wireless data traffic since the commercialization of 4G communication systems, the development focus has been on the $5^{th}$ Generation (5G) or pre-5G communication system. For this reason, the 5G or pre-5G communication system is called beyond 4G network communication system or post Long Term Evolution (LTE) system. In order to accomplish high data rates, consideration is being given to implementing the 5G communication system on the millimeter Wave (mm Wave) band (e.g., 60 GHz band). In order to mitigate propagation loss and increase propagation distance, the 5G communication system is likely to accommodate various techniques such as beamforming, massive MIMO, Full Dimensional MIMO (FD-MIMO), array antenna, analog beamforming, and large scale antenna. Also, for throughput enhancement of the 5G communication system, research is being conducted on various techniques such as small cell, advanced small cell, cloud radio access network (cloud RAN), ultra-dense network, Device to Device Communication (D2D), wireless backhaul, moving network, cooperative communication, Coordinated Multi-Points (CoMP), and interference cancellation. Furthermore, the ongoing research includes the use of Hybrid FSK and QAM modulation and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

Meanwhile, the Internet is evolving from a human-centric communication network in which information is generated and consumed by humans to the Internet of Things (IoT) in which distributed things or components exchange and process information. The combination of cloud server-based Big data processing technology and the IoT begets Internet of Everything technology. In order to secure the sensing technology, wired/wireless communication and network infrastructure, service interface technology, and security technology required for implementing the IoT, recent research has focused on the sensor network, Machine to Machine (M2M), and Machine Type Communication technologies. In the IoT environment, it is possible to provide an intelligent Internet Technology (IT) that is capable of collecting and analyzing data generated from the connected things to create new values for human life. The IoT can be applied to various fields such as smart home, smart building, smart city, smart car or connected car, smart grid, health care, smart appliance, and smart medical service through legacy Information Technology (IT) technology and convergence of various industries.

Thus there are various attempts to apply the IoT to the 5G communication system. For example, the sensor network, Machine to Machine (M2M), and Machine Type Communication (MTC) technologies are implemented by means of 5G communication technologies such as beamforming, MIMO, and array antenna. The application of the aforementioned cloud RAN as a big data processing technology is an example of convergence between the 5G and IoT technologies.

Meanwhile, the Universal Integrated Circuit Card (UICC) is the smart card used in mobile terminals. The UICC may include an access control module for access to mobile communication operator networks. Examples of the access control module include a Subscriber Identity Module (SIM), a Universal SIM (USIM), and an Internet Protocol (IP) multimedia service identity module (ISIM). The UICC including a USIM is called USIM card. Likewise, the UICC including an SIM is called SIM card. In the following description, the term "SIM card" is used in the meaning covering the UICC card, USIM card, and UICC including ISIM. That is, the proposed technique can be applied to all of SIM, USIM, ISIM, and other types of UICC.

The SIM card stores mobile communication subscriber information that is used for subscriber authentication and traffic security key generation in order to access to the mobile communication network for secure mobile communication.

Typically, SIM cards are manufactured on demand from mobile communication operators in an operator-specific manner. Accordingly, a SIM card is delivered in a state including authentication information (e.g., USIM application, IMSI, K value, and OPc value) for use in accessing the corresponding operator's network. The mobile communication operator delivers the SIM cards supplied by the manufacturer to the subscribers. Afterward, the mobile communication operator may manage the information in such a way of installing, updating, and deleting an application in the UICC using an Over The Air (OTA) technology. A subscriber may insert the UICC into the subscriber's mobile communication terminal for use of the corresponding mobile communication operator's network and application services; and the UICC makes it possible for the subscriber to use the authentication information, contact information, and phone book stored therein even when the subscriber changes an old mobile communication terminal for a new mobile communication terminal.

However, such a SIM card is inconvenient in that the mobile communication terminal user cannot use the services of other mobile communication operators. This means that in order to use a service provided by a certain mobile communication operator the user has to have a SIM card supplied by the corresponding mobile communication operator. For example, in order for a user traveling abroad to use the service provided by a local mobile communication operator, the user has to purchase a local SIM card. Although it may be possible to mitigate such inconvenience by subscribing to a roaming service, the roaming service is restrictive because of the expensive roaming service rate and even there may be no roaming agreement between the network operators.

If it is possible to download a SIM and install the SIM in the UICC, the above problem can be solved. In this case, the user may download anytime into the UICC a SIM corresponding to the mobile communication service in which the user is interested. It may be possible to install a plurality of downloaded SIMs into the UICC and use one of them selectively. The UICC may be fixed or detachable. Particularly, the UICC fixed in a terminal is called an embedded UICC (eUICC), and the eUICC may be configured to download a plurality of SIMs remotely for selective use thereof. In the following description, the UICCs capable of installing a plurality of SIMs downloaded remotely are generally called eUICC. That is, all the types of UICCs fixed to or detachable from a terminal that are capable of installing the SIMs downloaded remotely are generally called eUICCs. Also, the downloaded SIM information is referred to as profile or eUICC profile.

SUMMARY

The present invention aims to provide a communication channel establishment method and apparatus of a terminal for use of a communication service in a communication system. Also, the present invention aims to provide a real time profile download method and apparatus of a terminal for establishing a communication channel in a communication system. Also, the present invention aims to provide a method and apparatus for providing a terminal with a profile in a communication system.

Also, the present invention aims to provide a method for preventing a rogue Mobile Network Operator (MNO) from illegal profile download.

Also, the present invention aims to provide a root certificate information update method for allowing a terminal to authenticate a service for downloading a profile.

Also, the present invention aims to provide a method for a profile server to authenticate a terminal that inquires to a profile information transmission server about profile information.

Also, the present invention aims to provide a method for reinforcing private information security of a terminal in such a way that when the terminal inquires information to a profile information transmission server, the profile information transmission server processes an inquiry even although the profile information transmission server has no terminal information.

Also, the present invention aims to provide a method for determining an encryption parameter for use in authentication and encryption when a terminal downloads a profile from a profile provision server or a profile management server.

The objects of the present invention are not limited to the aforesaid, and other objects not described herein with be clearly understood by those skilled in the art from the descriptions below.

In accordance with an aspect of the present invention, a communication method of a terminal is provided. The communication method includes transmitting a first message including information on a profile to be received from a profile provision server; receiving a second message including information indicating whether an encryption code input is required and a first modified encryption code; generating, when the first modified encryption code is successfully authenticated, a second modified encryption code; transmitting to the profile provision server a third message including information requesting to the profile provision server for the second modified encryption code and profile download; and receiving a fourth message including information on the profile from the profile provision server.

Preferably, generating the second modified encryption code includes receiving the encryption code input by a user and generating the second modified encryption code by performing a hash operation on the encryption code with a predetermined random value.

Preferably, generating the second modified encryption code includes receiving the encryption code input by a user, generating a third modified encryption code by performing a hash operation on the encryption code with a predetermined random value, and authenticating the first modified encryption code by comparing the first modified encryption code with the third modified encryption code.

Preferably, the second message includes unencrypted profile information, and the fourth message comprises encrypted profile information.

In accordance with another aspect of the present invention, a communication method of a profile provision server is provided. The communication method includes receiving a first message including information on a profile requested by a terminal; generating a first modified encryption code for use by the terminal in authenticating the profile provision server; transmitting to the terminal a second message including information indicating whether encryption code input is required and the first modified encryption code; receiving a third message including a second modified encryption code and information requesting for download of the profile from the terminal; and transmitting, when the second modified encryption code is authenticated successfully, a fourth message including information on the profile to the terminal.

Preferably, generating the first modified encryption code includes receiving an encryption code from an operator and generating the first modified encryption code by performing a hash operation on the encryption code with a predetermined random value.

Preferably, transmitting the fourth message includes receiving an encryption code an operator, generating a third modified encryption code by performing a hash operation on the encryption code with a predetermined random value, and authenticating the second modified encryption code by comparing the second modified encryption code with the third modified encryption code In accordance with another aspect of the present invention, a terminal is provided. The terminal includes a transceiver for communicating signals with a network entity and a control unit which controls transmitting a first message including information on a profile to be received from a profile provision server; receiving a second message including information indicating whether an encryption code input is required and a first modified encryption code; generating, when the first modified encryption code is successfully authenticated, a second modified encryption code; transmitting to the profile provision server a third message including information requesting to the profile provision server for the second modified encryption code and profile download; and receiving a fourth message including information on the profile from the profile provision server.

In accordance with still another aspect of the present invention, a profile provision server is provided. The profile provision server includes a transceiver communicating signals with a network entity and a control unit which controls receiving a first message including information on a profile requested by a terminal; generating a first modified encryption code for use by the terminal in authenticating the profile provision server; transmitting to the terminal a second message including information indicating whether encryption code input is required and the first modified encryption code; receiving a third message including a second modified encryption code and information requesting for download of the profile from the terminal; and transmitting, when the second modified encryption code is authenticated successfully, a fourth message including information on the profile to the terminal.

The advantages of the present invention are not limited to the aforesaid, and other advantages not described herein will be clearly understood by those skilled in the art from the descriptions below.

DETAILED DESCRIPTION

Figure 1:
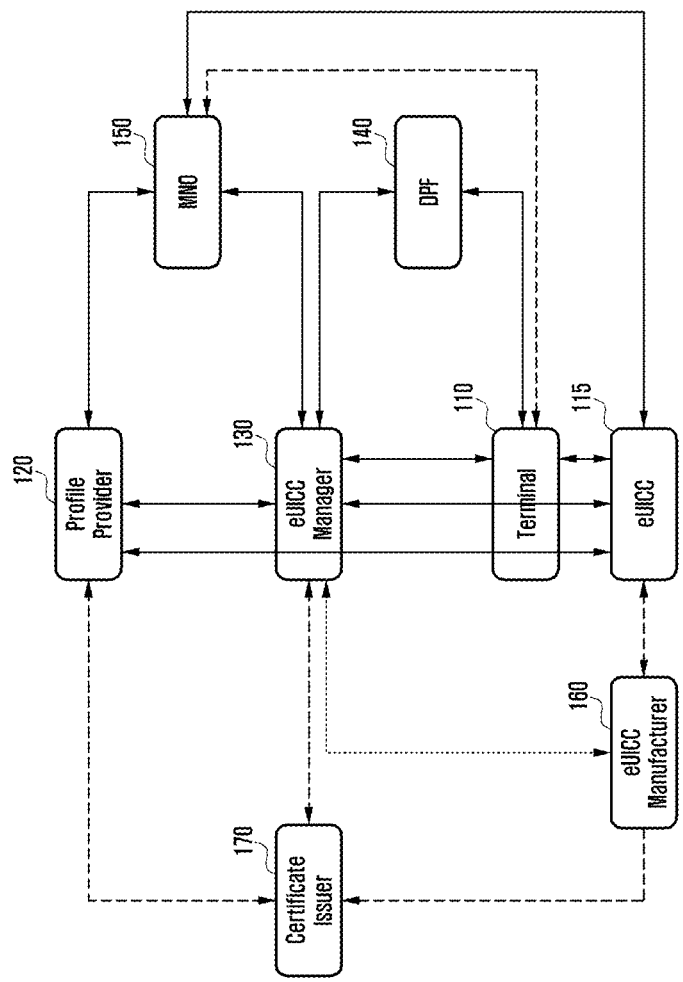
FIG. 1 is a diagram illustrating a profile installation and management mechanism according to an embodiment of the present invention.

Exemplary embodiments of the present invention are described with reference to the accompanying drawings in detail.

Detailed descriptions of well-known functions and structures incorporated herein may be omitted to avoid obscuring the subject matter of the present invention. This aims to omit unnecessary description so as to make the subject matter of the present invention clear.

It will be understood that when an element is referred to as being "connected to" or "coupled to" another element or layer, it can be directly connected or coupled to the other element or intervening elements may be present. It will be understood that the terms "comprises" "comprising," "includes" and/or "including" when used herein, specify the presence of stated features, integers, steps, operations, elements, and/or components, but they do not preclude the presence or addition of one or more other features, steps, operations, elements, components, and/or groups thereof.

Although the components are depicted separately to indicate distinctive features, this does not mean that the components are configured as individual hardware or software units. That is, the components are enumerated separately just for convenience of explanation, but at least two of the components can be implemented as a single component or one component can be divided into a plurality of components taking charge of corresponding functions. The embodiments of the integrated and divided components are included in the scope of the present invention without departing from the spirit of the present invention.

Some of the components may not be essential components for inevitable functions of the invention, but they may be optional components just for performance enhancement. The present invention can be implemented with only the essential components required for implementing the subject matter of the present invention with the exception of the optional components for performance enhancement, and such a configuration with only the essential components with the exception of the optional components can be included in the claims of the present invention.

Detailed descriptions of well-known functions and structures incorporated herein may be omitted to avoid obscuring the subject matter of the present invention. Exemplary embodiments of the present invention are described in detail with reference to the accompanying drawings. Further, the following terms are defined in consideration of the functionality in the present invention and may vary according to the intention of a user or an operator, usage, etc. Therefore, the definition should be made on the basis of the overall content of the present specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The term "module" according to the embodiments of the invention means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The terms used in the following description are provided to help understanding the present invention and may be modified into different forms without departing from the spirit of the present invention.

First, the terms used in the present invention are defined.

FIG. 1 is a diagram illustrating a profile installation and management mechanism according to an embodiment of the present invention.

In the present invention, the Universal Integrated Circuit Card (UICC) 115 is a smart card formed to be attachable to the mobile communication terminal 110 and having a chip capable of storing personal information such as network access authentication information of the subscriber, phonebook, and Short Message Service (SMS) information. The UICC 115 is used for subscriber authentication and traffic security key creation in the process of access to a mobile communication network (such as Global System for Mobile communication (GSM), Wideband Code Division Multiple Access (WCDMA), and Long Term Evolution (LTE) networks) for secure mobile communication. The UICC 115 is provided with a network-specific identity application (such as Subscriber Identity Module (SIM), Universal SIM (USIM), and Internet Protocol Multimedia Service Identity Module (ISIM)) and provides a higher level security function for supporting various applications (such as an electronic wallet, electronic ticket issuer, and electronic passport).

The UICC 115 is an embedded UICC which is fixed to the terminal 110 in the form of a chip so as not to be attachable to or detachable from the terminal 110. The eUICC 115 may be downloaded in the form of a profile through Over The Air (OTA) technique and then installed in the terminal 110. In the present invention, the eUICC 115 represents all types of UICCs that are capable of downloading and installing a profile. In the following description, all the types of UICCs fixed to and attachable to/detachable from the terminal 110 that are capable of remotely downloading and installing a SIM are referred to as eUICC. Also, the downloaded SIM information is interchangeably referred as eUICC profile or profile.

The method for downloading a profile through an OTA technique and installing the profile in the eUICC 115 according to an embodiment of the present invention can be applied to the case of using the UICC attachable to/detachable from the terminal 110. That is, according to an embodiment of the present invention, it is possible to download a profile using the OTA technique and installing the downloaded profile in the UICC 115.

In the following description, the terms "UICC" and "SIM" are interchangeably used, and the terms "eUICC" and "eSIM" are interchangeable used.

In the following description, the term "profile" may denote a software package comprised of an application, a file system, and an authentication key in the form of being in the UICC.

In the following description, the term "USIM profile (SIM profile)" is interchangeably used with the same meaning as "profile" or may denote a software package containing the information stored in the USIM application of the profile.

In the following description, the profile provision server 120 may be interchangeably referred to as Subscription Manager Data Preparation (SM-DP), SM-DP Plus (SM-DP+), off-card entity of Profile Domain, profile encryption server, profile creation server, Profile Provisioner (PP), profile provider, and Profile Provisioning Credentials (PPC) holder.

In the following description, the profile information delivery server 140 may be interchangeably referred to as Discovery and Push Function (DPF) and Subscription Manager Discovery Service (SM-DS).

In the following description, the profile management server 130 may be interchangeable referred to as Subscription Manager Secure Routing (SM-SR), SM-SR plus (SM-SR+), off-card entity of eUICC Profile Manager, PMC holder, and eUICC Manager (EM).

In the following description, the profile provision server 120 may integrate the functions of the profile management server 130. According to various embodiments of the present invention, the operations of the profile provision server 120 may be performed by the profile management server 130. Likewise, the operations of the profile management server or SM-SR 130 may be performed by the profile provision server 120.

In the following description, the terminal 110 may be interchangeable referred to as "terminal", "mobile communication terminal", "mobile station (MS)", "User Equipment (UE)", "User Terminal (UT)", "radio terminal", "Access Terminal (AT)", "subscriber unit", "Subscriber Station (SS)", "wireless device", "wireless communication device", "Wireless Transmit/Receive Unit (WTRU)", "mobile node", and the like. Examples of the terminal 110 may include a cellular phone, a radio communication-enabled smartphone, a radio communication-enabled Personal Digital Assistant (PDA), a wireless modem, a radio communication-enable portable computer, a radio communication-enabled digital camera, a radio communication-enabled gaming device, a radio-communication-enabled music storage and playback appliance, an wireless Internet access and browsing-enabled appliance, and other units and terminals integrating functions of part of the aforementioned devices. The terminal may include, but is not limited to, a Machine to Machine (M2M) terminal and Machine Type Communication (MTC) terminal/device. In the following description, the terminal may be interchangeably referred to as an electronic device.

In the present invention, an electronic device may include a UICC 115 capable of installing a downloaded profile therein. If the UICC 115 is not embedded in the electronic device, a detachable UICC may be physically connected to the electronic device. For example, the UICC 115 may be designed in the form of a card so as to be inserted into the electronic device. For example, the electronic device may be the terminal 110 and, in this case, the terminal 110 may have the UICC 115 for installing a downloaded profile therein. The UICC 115 may be embedded in the terminal 110 and, if not, the UICC 115 may be attached to or detached from the terminal 110 so as to establish or release electrical connection. The UICC 115 capable of installing a downloaded profile therein may be referred to as an eUICC 115.

In the present invention, a profile identifier may be interchangeably referred to as "profile ID", "Integrated Circuit Card ID (ISD-P)", and "factor matching Profile Domain (PD)". The profile ID may be a unique identifier per profile.

In the present invention, the eUICC ID may be called EID as a unique identifier of the eUICC 115 embedded in the terminal. In the case that a provisioning profile is embedded in the eUICC 115, the eUICC ID may be an identifier of the provisioning profile. According to an embodiment of the present invention, the eUICC 115 is fixed to the terminal 110 and, in this case, the eUICC ID may be the terminal ID. The eUICC ID may be interchangeably referred to as a specific secure domain of the eUICC 115.

In the present invention, the profile container may be referred to as a profile domain. The profile container may be a security domain.

In the present invention, the Application Protocol Data Unit (APDU) may be a message for the terminal 110 to interoperate with the eUICC 115. The APDU may be a message for the PP 120 or PM 130 to interoperate with the eUICC 115.

In the present invention, Profile Provisioning Credentials (PPC) may be a means for use in mutual authentication, profile encryption, and signature between the PP 120 and the eUICC 115. The PPC may include at least one of a symmetric key, a pair of a Rivest-Shamir-Adleman (RSA) certificate and a private key, a pair of an Elliptic Curved Cryptography (ECC) certificate and a private key, and a pair of a root certification authority (CA) and a certificate chain. In the case that there are multiple PPs, the eUICC 115 may store and use PP-specific PPCs.

In the present invention, the Profile Management Credentials (PMC) may be a means for use in mutual authentication, transmission data encryption, and signature between the PM 130 and the eUICC 115. The PMC may include at least one of a symmetric key, a pair of an RSA certificate and a private key, a pair of an ECC certificate and a private key, and a pair of a root CA and a certificate chain.

In the present invention, the AID may be an application identifier. This value may be used as an identifier for distinguishing between applications in the eUICC 115.

In the present invention, the profile package TLV may be interchangeably referred to as Profile TLC. The profile package TLV may be a data set expressing the information constituting the profile in the form of Tag, Length, and Value (TLV).

In the present invention, the AKA is an acronym for Authentication and Key Agreement as an authentication algorithm for access to 3GPP and 3GPP 2 networks.

In the present invention, K denotes an encryption key value stored in the eUICC 115 for use in the AKA authentication algorithm.

In the present invention, the OPc denotes a parameter stored in the eUICC 115 for use in the AKA authentication algorithm.

In the present invention, NAA is an acronym for Network Access Application, which is an application stored in the UICC 115 for use in access to a network such as USIM and ISIM. That is, the NAA is a network access module.

Meanwhile, the UICC 115 may be designed to be inserted into the terminal 110. In this case, the UICC 115 may be attachable/detachable to/from the terminal 110 or embedded in the terminal 110. The profile of the UICC 110 may include "access information" for use in access to a specific operator's network. The access information may include a K or Ki value for authentication in the network along with the IMSI as a subscriber identifier.

Then the terminal 110 may perform authentication with an authentication processing system (e.g., Home Location Register (HLR)) or AuC of the mobile operator using the UICC 115. The authentication procedure may be an AKA procedure. If the authentication is successful, the terminal 110 is capable of using mobile communication services such as mobile telephony and mobile data services using the networks of the mobile communication system.

Detailed descriptions of well-known functions and constructions incorporated herein may be omitted to avoid obscuring appreciation of the subject matter of the present invention.

As described above, the eUICC 115 may be implemented in the form of a UICC card or chip embedded in the terminal 110 or attachable/detachable to/from the terminal 110. The eUICC 115 may be a UICC having one of various sizes as well as being implemented in one of the legacy form factors such as 2FF, 3FF, 4FF, MFF1, and MFF2. The eUICC 115 may be embedded in the terminal 110 or integrated into a communication chip (e.g., baseband modem) of the terminal 110.

The profile provision server 120 may have a function of generating a profile and encrypting the profile and may be referred to as SM-DP+.

The profile management server 130 may be referred to as EM or SM-SR+ and take charge of relaying the profile received from the SM-DP+ 120 to the Local Profile Assistant (LPA) of the terminal 110 or managing the profile. At this time, the SM-SR+ 130 may control profile download and profile management operations between the SM-DP+ 120 and the LPA of the terminal 110.

The profile information delivery server 140 may be referred to as SM-DS or DPF and may relay the SM-SR+ server address and event identifier received from the SM-SR+ 130 to the LPA of the terminal 110.

According to an embodiment of the present invention, the SM-DP+ 120 and SM-SR+ 130 may be implemented as a single server, which may be referred to as SM-DP+ or Subscription Manager plus (SM+).

The eUICC manufacturer (EUM) 160 may manufacture the eUICC 115 and supply the manufactured eUICC 1150 to the mobile communication operator or a terminal manufacturer. The mobile network operator (MNO) 150 may be a mobile communication network operator for providing the terminal with a mobile communication service. The certificate issuer (CI) 170 may authenticate the profile provision server 120, the profile management server 130, the profile information delivery server 140, and the EUM 160. According to an embodiment of the present invention, the terminal 110 may include a transceiver for receiving an encrypted profile or a unencrypted profile from the SM-DP+ 120 or the SM-SR+ 130; a display unit for displaying the unencrypted profile information; a User Interface (UI) unit for asking the user for confirmation on the receipt of the profile, the display and confirmation input process being performed before the receipt of the encrypted profile during the profile download procedure; and a control unit for determining whether to continue or stop the profile download procedure based on the user input.

In a wireless communication system according to an embodiment of the present invention, the SM-DP+ 120 may generate raw profile information and an encrypted profile during the profile download procedure and transmits the encrypted profile information to the control unit and the transceiver only when a normal profile download request message is received from the terminal 110 after transmitting the raw profile information.

In a wireless communication system according to an embodiment of the present invention, the terminal 110 may include a transceiver for receiving an encrypted profile and unencrypted raw profile information from the SM-DP+ 120 or the SM-SR+ 130; a display unit for displaying the raw profile information; a control unit for determining whether to ask the user to input a configuration code based on an indicator of whether a user's confirmation code is required as part of the information received from the SM-DP+ 120 during the profile download procedure; and a UI unit for asking the user for the confirmation code separately from or simultaneously with displaying the raw profile information, the control unit performing a hash operation on the confirmation code input by the user and a random value received from the SM-DP+ 120 or the SM-SR+ 130 during the profile reception procedure and controlling to transmit the operation result value to the SM-DP+ 120 or the SM-SR+ 130 during the profile reception procedure.

In a wireless communication system according to an embodiment of the present invention, the SM-DP+ 120 may include a storage unit for storing the information indicating whether a confirmation code is required for downloading a specific profile and the configuration code information; a transceiver; and a control unit which controls the transceiver to transmit the information indicating whether the configuration code is required for downloading the specific profile to the terminal 110, which compares, when the confirmation code is required, the hash operation value received from the terminal 110 with a hash operation value calculated by the SM-DP+ 120 using the confirmation code stored in the SM-DP+ 120 and the random value received from the terminal 110, and which controls, when the hash values mismatch, the transceiver to not transmit the encrypted profile to the terminal 110.

Preferred embodiments of the present invention are described hereinafter.

Figure 2:
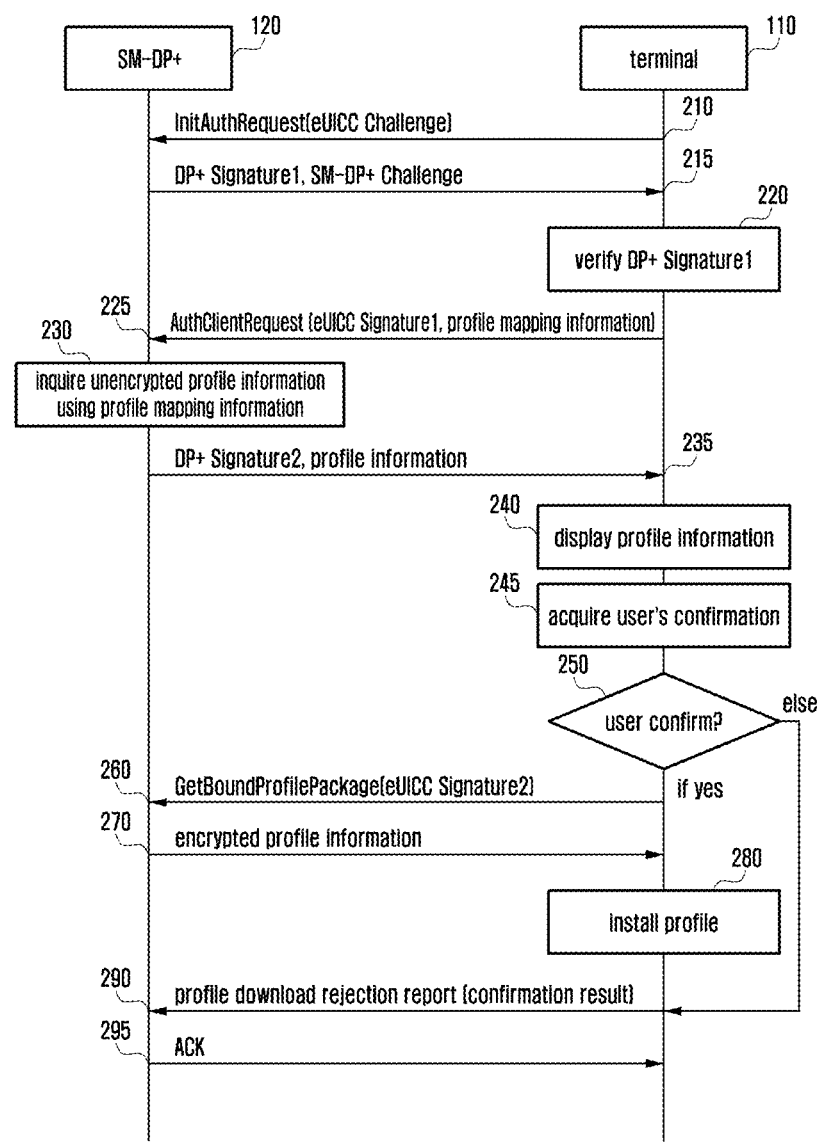
FIG. 2 is a signal flow diagram illustrating a profile download method of a terminal according to an embodiment of the present invention

FIG. 2 is a signal flow diagram illustrating a profile download method of a terminal according to an embodiment of the present invention.

In reference to FIG. 2, the terminal 110 may generate server verification information for verifying the server at step 210. At this time, the server verification information may be a random value, e.g. a challenge value. The challenge value may be a value generated by the control unit of the terminal 110 or the eUICC 115 connected to the terminal 110 and may be called the eUICC challenge value. The terminal 110 may send the profile provision server 120 a message including the information for verifying the server. This message may be an initial authentication request (IniAuthRequest) message. The profile provision server 120 may be the SM-DP+. The terminal 110 may include the eUICC 115, which may perform part of the operations of the terminal 110.

The SM-DP+ 120 may generate terminal verification information for verifying the terminal 110 at step 215. At this time, the terminal verification information may be a random value, e.g., SM-DP+ challenge value, which is generated by the control unit of the SM-DP+ 120. The SM-DP+ 120 may calculate an SM-DP+ signature for the data including the eUICC challenge value received at step 210 and the SM-DP+ challenge value generated by the SM-DP+ 120. The calculated SM-DP+ signature value may be SM-DP+ signature1. The SM-DP+ signature1 is calculated using an SM-DP+ secret key. The SM-DP+ 120 may send the terminal 110 a response message including the SM-DP+ signature1 and SM-DP+ challenge value.

The terminal 110 may verify the SM-DP+ signature1 and continue with the subsequent procedure in the case when the verification succeeds or may not continue with the subsequent procedure in the case when the verification fails.

If the SM-DP+ 120 is verified successfully at step 220, the terminal 110 may generate an eUICC signature for the data including the SM-DP+ challenge at step 225. The eUICC signature may be the eUICC signature1. The eUICC signature1 may be a signature created with a private key of the eUICC 115. The terminal 110 may send the SM-DP+ 120 a message including the eUICC signature1 and profile information. This message may be an Authentication Request message (e.g., AuthClientRequest). The profile information may include profile mapping information for use by the SM-DP+ 120 in identifying the profile or a type of the profile. At this time, the profile information may include the profile mapping information as follows:

eUICC Identifier or EID
eUICC certificate
EventID
MatchingID
ActivationToken
NotificationID The SM-DP+ 120 may check a specific profile or profile information corresponding to the type of the profile from the profile mapping information at step 230.

At step 235, the SM-DP+ 120 may calculate s signature value (SM-DP+ signature2) for the data including the profile information checked at step 230. The SM-DP+ 120 may send the terminal 110 the signature value (SM-DP+ signature2) and the profile information. The profile information may be the unencrypted raw profile information.

Then the terminal 110 may display part or whole of the profile information received at step 235 or the information mapped to the part or whole of the profile information on the display unit. The mapped information may be a value stored in the terminal 110 previously or received from an external server. The part or whole of the profile information for use in the mapping process is as follows:

IMSI
Information including MCC or MNC
Information including MCC and MNC
Operator name
Information constituting part of ICCID information
Operator code The terminal 110 may receive a user input for profile download confirmation at step 245. That is, the terminal 110 may receive a user input for confirming the profile download.

The profile download confirmation input may be made as follows.

Input action made simply onto a position corresponding to a "Yes" item in the state that "Yes" and "No" items are displayed on the display unit using an input device (e.g., touch pad and button) of a User Interface (UI)
Input with biometric authentication such as fingerprint authentication and iris authentication The terminal 110 may determine at step 250 whether the user has confirmed the profile download at the user confirmation step 245.

If it is determined at step 250 that the user has confirmed the profile download, the terminal 110 may request to the SM-DP+ 120 for profile download at step 260. At this time, the terminal 110 may generate the eUICC signature value (eUICC signature2) in response to the profile download request information. The terminal 110 may send the SM-DP+ 120 a message (e.g., GetBoundProfilePackage) including the eUICC signature value (eUICC signature2) and the profile download request information.

At step 270, the SM-DP+ 120 may send the terminal 110 an encrypted profile according to the profile download request information received at step 260.

Then the terminal 110 may decode the encrypted profile and install the profile at step 280. The profile decoding may be performed in the eUICC 115 of the terminal 110.

If it is determined at step 250 that the user has not confirmed the profile download, the terminal 110 may send the SM-DP+ 120 a profile download rejection report and/or confirmation result at step 290. Then the terminal 110 may stop the profile download procedure.

If the profile download rejection report is received, the SM-DP+ 120 may stop the profile download procedure at step 295. In this case, the SM-DP+ 120 may send the terminal 110 an Acknowledgement (ACK) message in response to the profile download rejection report.

It is obvious to those skilled in the art that the above-described profile download procedure can be applied to other types of communication systems.

Figure 3:
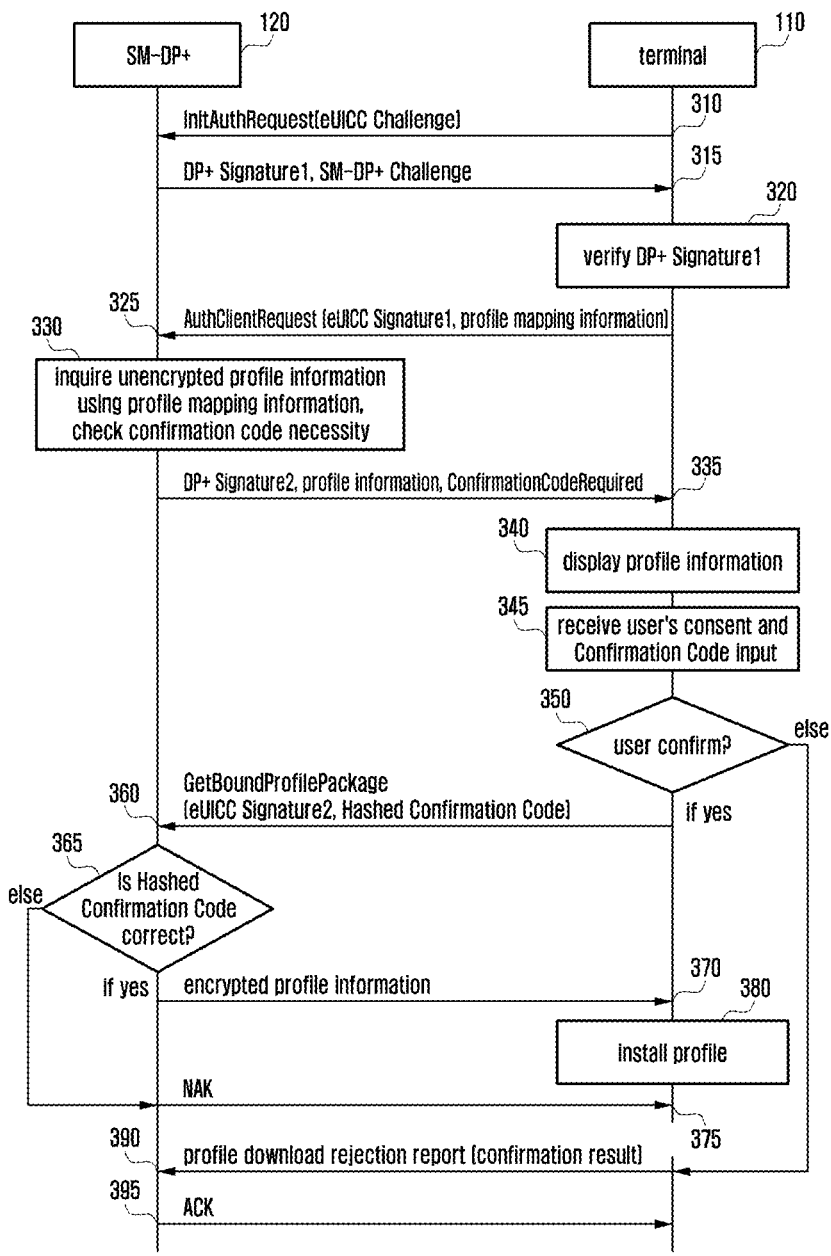
FIG. 3 is a signal flow diagram illustrating a profile download method of a terminal according to an embodiment of the present invention.

FIG. 3 is a signal flow diagram illustrating a profile download method of a terminal according to an embodiment of the present invention.

In reference to FIG. 3, the terminal 110 may generate server verification information for verifying the server at step 310. The server verification information may be a random value, e.g., challenge value. The challenge value may be generated by the control unit of the terminal 110 or the eUICC 115 connected to the terminal 110 and may be called the eUICC challenge value. The terminal 110 may send the profile provision server 120 a message including the server verification information. This message may be an initial authentication request message (e.g., InitAuthRequest). The profile provision server 120 may be an SM-DP+. The terminal 110 may include the eUICC 115 that takes charge of part of the operations of the terminal 110.

The SM-DP+ 120 may generate terminal verification information for verifying the terminal 110 at step 315. The terminal verification information may be a random value, e.g., SM-DP+ challenge value, which may be generated by the control unit of the SM-DP+ 120. The SM-DP+ 120 may calculate a signature value for data including the eUICC challenge value received at step 310 and the SM-DP+ challenge value generated by the SM-DP+ 120. At this time, the SM-DP+ signature value may be SM-DP+ signature1. The SM-DP+ signature1 may be a value calculated using a SM-DP+ secret key. The SM-DP+ 120 may send the terminal 110 a response message including the SM-DP+ signature1 and SM-DP+ challenge value.

The terminal 110 may verify the SM-DP+ signature1 at step 320 and continue with the procedure in the case when the SM-DP+ verification succeeds or may stop the procedure in the case when the SM-DP+ verification fails.

If the SM-DP+ verification succeeds at step 320, the terminal 110 may generate an eUICC signature for the data including the SM-DP+ challenge at step 325. The eUICC signature may be eUICC signature1. The eUICC signature1 may be a signature generated using the private key of the eUICC 115. The terminal 110 may send the SM-DP+ 120 a message including the eUICC signature1 and profile information. This message may be an authentication request message (e.g., AuthClientRequest). The profile information may include profile mapping information for use by the SM-DP+ 120 in identifying the profile or a specific type of profile. The profile information may include the profile mapping information as follows:

eUICC Identifier or EID
eUICC certificate
EventID
MatchingID
ActivationToken
NotificationID The SM-DP+ 120 may check profile information corresponding to a specific profile or the type of the profile from the profile mapping information at step 330.

The SM-DP+ 120 may determine whether a user's confirmation code input is required for downloading the corresponding profile. If the SM-DP+ 120 has the information indicating whether the user's confirmation code input is required, it may check the corresponding information.

At step 335, the SM-DP+ 120 may calculate a signature value (SM-DP+ signature2) for the data including the profiled information checked at step 330. The SM-DP+ 120 may send the signature value (SM-DP+ signature2), unencrypted profile information, and the information indicating whether the confirmation code input is required (ConformationCodeRequired). For example, the information indicating whether a confirmation code input is required may be a 1-bit signal, which is set to 0 for the case of requiring no confirmation code input or 1 for the case of requiring the confirmation code input. The profile information may be the unencrypted profile information.

At step 340, the terminal 110 may display part or whole of the profile information received at step 335 or information mapped to the part or whole of the profile information on the display unit. The mapped information may be a value that is previously stored or received from an external server. The part or whole of the profile information for use in the mapping process may include the information as follows:

IMSI
Information including MCC or MNC
Information including MCC and MNC
Operator name
Information constituting part of ICCID information
Operator code The terminal 110 may receive a user's confirmation for profile download at step 345. That is, the user may make an input for confirming the profile download to the terminal 110.

The profile download confirmation input may be made as follows.

Input action made simply onto a position corresponding to a "Yes" item in the state that "Yes" and "No" items are displayed on the display unit using an input device (e.g., touch pad and button) of a User Interface (UI)
Input with biometric authentication such as fingerprint authentication and iris authentication The terminal 110 may determine whether the confirmation code is required by checking the corresponding information received form the SM-DP+ 120 simultaneously with or separately from the user's confirmation process or without the user's confirmation process. If information is received indicating whether the confirmation code input is required, the terminal 110 may ask the user for the confirmation code and receive the confirmation code input through the UI. Then the terminal 110 may perform a hash operation on the confirmation code input by the user and the SM-DP+ challenge information received at step 315. The terminal 110 may generate a modified confirmation code (or hash confirmation code (hashed confirmation code)) through the hash operation. The hash operation may be performed one or more times to hide the confirmation code. It may also be possible to generate a unique hash result value every time using the SM-DP+ challenge value for the operation. This operation may be performed by one or more CPUs of the terminal 110. For example, it may be possible to improve security by having an Application Processor (AP) take charge of part of the operation and a modem or the eUICC 115 take charge of the rest part of the operation.

At step 350, the terminal 110 may determine whether the user has confirmed the profile download at step 345.

If it is determined at step 350 that the user has confirmed the profile download, the terminal 110 may request to the SM-DP+ 120 for profile download at step 360. At this time, the terminal 110 may generate an eUICC signature value (eUICC signature2) for the profile download request information. The terminal 110 may send the SM-DP+ 120 a request message (e.g., GetBoundProfilePackage) including the eUICC signature value (eUICC signature2) and the profile download request information.

The request message may include the hashed confirmation code.

The SM-DP+ 120 may verify the hashed confirmation code at step 365.

The SM-DP+ 120 may determine at step 360 whether the request message received at step 360 includes the hashed confirmation code. If the request message received at step 360 includes no hashed confirmation code, the SM-DP+ 120 may perform step 375.

If the request message received at step 360 includes the hashed confirmation code, the SM-DP+ 120 may calculate the hashed confirmation code by itself. The SM-DP+ 120 may determine whether the calculated hashed confirmation code and the received hashed confirmation code match.

If the two codes match, the SM-DP+ 120 may perform step 370.

Otherwise, if the two codes do not match, the SM-DP+ 120 may send the terminal 110 a message including information indicating the profile download failure and end the procedure.

At step 370, the SM-DP+ 120 may send the terminal 110 the encrypted profile according to the profile download request information received at step 360.

Then then terminal 110 may decode the encrypted profile and install the profile at step 380. The profile decoding may be performed in the eUICC 115 of the terminal 110.

If it is determined at step 350 that the user has not confirmed the profile download, the terminal 110 may send the SM-DP+ the profile download rejection report and/or confirmation result at step 390. Then the terminal 110 may end the profile download procedure.

If the profile download rejection report is received, the SM-DP+ 120 may end the profile download procedure at step 395. At this time, the SM-DP+ 120 may send the terminal 110 an acknowledgement (ACK) message in response to the profile download rejection report.

It is obvious to those skilled in the art that the above-described profile download procedure can be applied to other types of communication systems.

Figure 4:
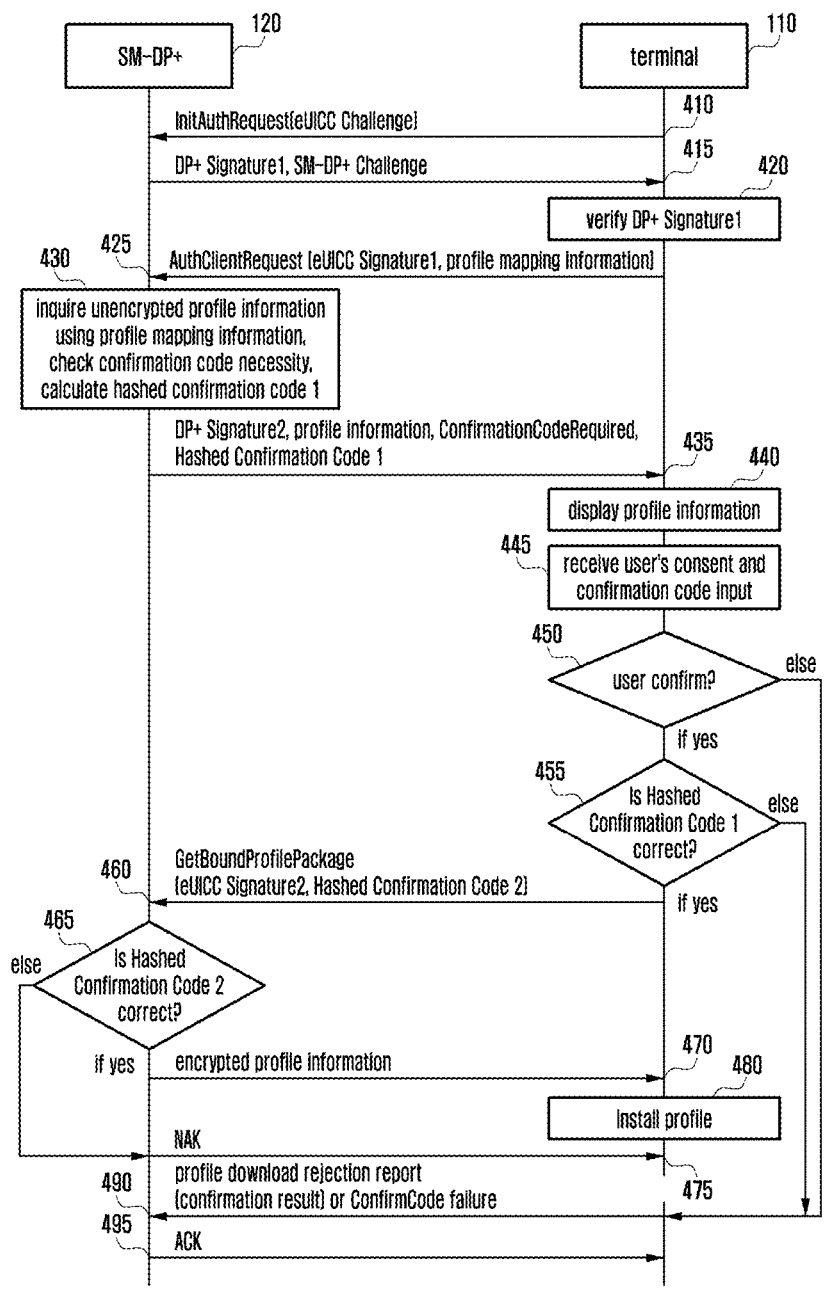
FIG. 4 is a signal flow diagram illustrating a profile download method of the terminal according to another embodiment of the present invention.

FIG. 4 is a signal flow diagram illustrating a profile download method of the terminal according to another embodiment of the present invention.

In reference to FIG. 4, the terminal 110 may generate server verification information for verifying the server at step 410. The server verification information may be a random value, e.g., challenge value. The challenge value may be generated by the control unit of the terminal 110 or the eUICC 115 connected to the terminal 110 and may be called the eUICC challenge value. The terminal 110 may send the profile provision server 120 a message including the server verification information. This message may be an initial authentication request message (e.g., InitAuthRequest). The profile provision server 120 may be an SM-DP+. The terminal 110 may include the eUICC 115 that takes charge of part of the operations of the terminal 110.

The SM-DP+ 120 may generate terminal verification information for verifying the terminal 110 at step 415. The terminal verification information may be a random value, e.g., SM-DP+ challenge value, which may be generated by the control unit of the SM-DP+ 120. The SM-DP+ 120 may calculate a signature value for data including the eUICC challenge value received at step 410 and the SM-DP+ challenge value generated by the SM-DP+ 120. At this time, the SM-DP+ signature value may be SM-DP+ signature1. The SM-DP+ signature1 may be a value calculated using a SM-DP+ secret key. The SM-DP+ 120 may send the terminal 110 a response message including the SM-DP+ signature1 and SM-DP+ challenge value.

The terminal 110 may verify the SM-DP+ signature1 at step 420 and continue the procedure in the case when the SM-DP+ verification succeeds or may stop the procedure in the case when the SM-DP+ verification fails.

If the SM-DP+ verification succeeds at step 420, the terminal 110 may generate an eUICC signature for the data including the SM-DP+ challenge at step 425. The eUICC signature may be eUICC signature1. The eUICC signature1 may be a signature generated using the private key of the eUICC 115. The terminal 110 may send the SM-DP+ 120 a message including the eUICC signature1 and profile information. This message may be an authentication request message (e.g., AuthClientRequest). The profile information may include profile mapping information for use by the SM-DP+ 120 in identifying the profile or a specific type of profile. The profile information may include the profile mapping information as follows:

eUICC Identifier or EID
eUICC certificate
EventID
MatchingID
ActivationToken
NotificationID The SM-DP+ 120 may check profile information corresponding to a specific profile or the type of the profile from the profile mapping information at step 430.

The SM-DP+ 120 may determine whether a user's confirmation code input is required for downloading the corresponding profile. If the SM-DP+ 120 has the information indicating whether the user's confirmation code input is required, it may check the corresponding information.

If it is required for the user to input a confirmation code, the SM-DP+ 120 may generate a first modified confirmation code (or first hash confirmation code (hashed confirmation code 1) to protect the terminal 110 against a malicious operator or server. At this time, the hashed confirmation code 1 may be calculated as follows:

$$\text{hashed confirmation code 1}=\text{hash function}(\text{confirmation code},\text{random number A})$$

At this time, the confirmation code may be received from the operator, and the random number A may be an arbitrary random value that the terminal 110 has already known or will know. For example, the random number A may be the eUICC challenge or SM-DP+ challenge.

The hash function may be a function for performing one or more hash operations on the input factors of the confirmation code and the random number A. The hashed confirmation code 1 may be calculated as follows:

hashed confirmation code 1=SHA256(confirmation code|SM-DP+challenge)

If the SM-DP+ 120 transmits the hashed confirmation code 1 to the terminal 110, the terminal 110 may calculate the hashed confirmation code 1 based on the confirmation code input by the user at step 445. It is possible to prevent the terminal 110 from downloading a profile from an unknown malicious operator or SM-DP+ 120 by comparing the calculated hashed confirmation code 1 and the received hashed confirmation code 1.

At step 435, the SM-DP+ 120 may calculate the signature value (SM-DP+ signature2) for the data including the profile information acquired at step 430. The SM-DP+ 120 may send the terminal 110 the signature value (SM-DP+ signature2), the unencrypted profile information, the information indicating whether confirmation code input is required (ConfirmationCodeRequired), and the hashed confirmation code 1. For example, the information indicating whether a confirmation code input is required may be a 1-bit signal, which is set to 0 for the case of requiring no confirmation code input or 1 for the case of requiring the confirmation code input. The profile information may be the unencrypted profile information.

At step 440, the terminal 110 may display part or whole of the profile information received at step 435 or information mapped to the part or whole of the profile information on the display unit. The mapped information may be a value that is previously stored or received from an external server. The part or whole of the profile information for use in the mapping process may include the information as follows:

IMSI
Information including MCC or MNC
Information including MCC and MNC
Operator name
Information constituting part of ICCID information
Operator code The terminal 110 may receive a user's confirmation for profile download at step 445. That is, the user may make an input for confirming the profile download to the terminal 110.

The profile download confirmation input may be made as follows.

Input action made simply onto a position corresponding to a "Yes" item in the state that "Yes" and "No" items are displayed on the display unit using an input device (e.g., touch pad and button) of a User Interface (UI)
Input with biometric authentication such as fingerprint authentication and iris authentication The terminal 110 may determine whether the confirmation code is required by checking the corresponding information received form the SM-DP+ 120 simultaneously with or separately from the user's confirmation process or without the user's confirmation process. If the information is received indicating whether the confirmation code input is required, the terminal 110 may ask the user for the confirmation code and receive the confirmation code input through the UI.

The terminal 110 may verify the hashed confirmation code 1 transmitted by the SM-DP+ 120 at step 435 using the confirmation code input by the user and the SM-DP+ challenge information received at step 415. That is, the terminal 110 may calculate the hashed confirmation code 1 by itself using the confirmation code input by the user and the SM-DP+ challenge information received at step 415. Then the terminal 110 may determine whether the calculated hashed confirmation code 1 is identical with the hashed confirmation code 1 received from the SM-DP+ 120.

The terminal 110 may calculate a second modified confirmation code (or second hash confirmation (hashed confirmation code 2)). The hash operation may be performed one or more times to hide the confirmation code. It may also be possible to generate a unique hash result value every time using the SM-DP+ challenge value for the operation. The hashed confirmation code 2 may be calculated with a formula different from that of the hashed confirmation code 1. This operation may be performed by one or more CPUs of the terminal 110. For example, it may be possible to improve security by having an Application Processor (AP) take charge of part of the operation and a modem or the eUICC 115 take charge of the other part of the operation.

At step 450, the terminal 110 may determine whether the user has confirmed the profile download at step 445.

If it is determined at step 450 that the user has confirmed the profile download, the terminal 110 may determine at step 455 whether the hashed confirmation code 1 is verified successfully.

If the user has confirmed the profile download at step 450 and if the hashed confirmation code 1 received from the SM-DP+ 120 at step 435 and the hashed confirmation code 1 calculated by the terminal 110 at step 445 match, the terminal 110 may request to the SM-DP+ 120 for profile download at step 460. At this time, the terminal 110 may generate an eUICC signature value (eUICC signature2) for the profile download request information. The terminal 110 may send the SM-DP+ 120 a request message (e.g., GetBoundProfilePackage) including the eUICC signature value (eUICC signature2) and the profile download request information.

The request message may include the hashed confirmation code 2.

The SM-DP+ 120 may verify the hashed confirmation code 2 at step 465.

The SM-DP+ 120 may determine whether the request message received from the terminal 110 at step 460 includes the hashed confirmation code 2. If the request message includes no hashed confirmation code 2, the SM-DP+ 120 may perform step 475.

If the request message received at step 460 includes the hashed confirmation code 2, the SM-DP+ 120 may calculate the hashed confirmation code 2 by itself. Then the SM-DP+ 120 may determine whether the calculated hashed confirmation code 2 and the received hashed confirmation code 2 match.

If the two code values match, the SM-DP+ 120 may perform step 470.

If the two code values do not match, the SM-DP+ 120 may send the terminal 110 a message including the information indicating profile download failure and end the procedure.

At step 470, the SM-DP+ 120 may send the terminal 110 an encrypted profile according to the profile download request information received at step 460.

Then the terminal 110 may decode the encrypted profile and install the profile at step 480. The profile decoding may be performed in the eUICC 115 inside the terminal 110.

If either the user rejects the profile download at step 450 or the hashed confirmation codes do not match at step 455, the terminal 110 may send the SM-DP+ 120 the profile download rejection report and/or the confirmation result and/or the confirmation code mismatch result at step 490. Then the terminal 110 ends the profile download procedure.

According to an embodiment of the present invention, when the hashed confirmation code 1 values do not match, the terminal 110 may ask the user for a confirmation code, compare the input confirmation code with the hashed confirmation code 1, and perform step 460 according to the comparison result.

If the profile download rejection report is received, the SM-DP+ 120 may end the profile download procedure at step 495. At this time, the SM-DP+ 120 may send the terminal 110 an ACK message in response to the profile download rejection report.

It is obvious to those skilled in the art that the above-described profile download procedure can be applied to other types of communication systems.

Figure 5:
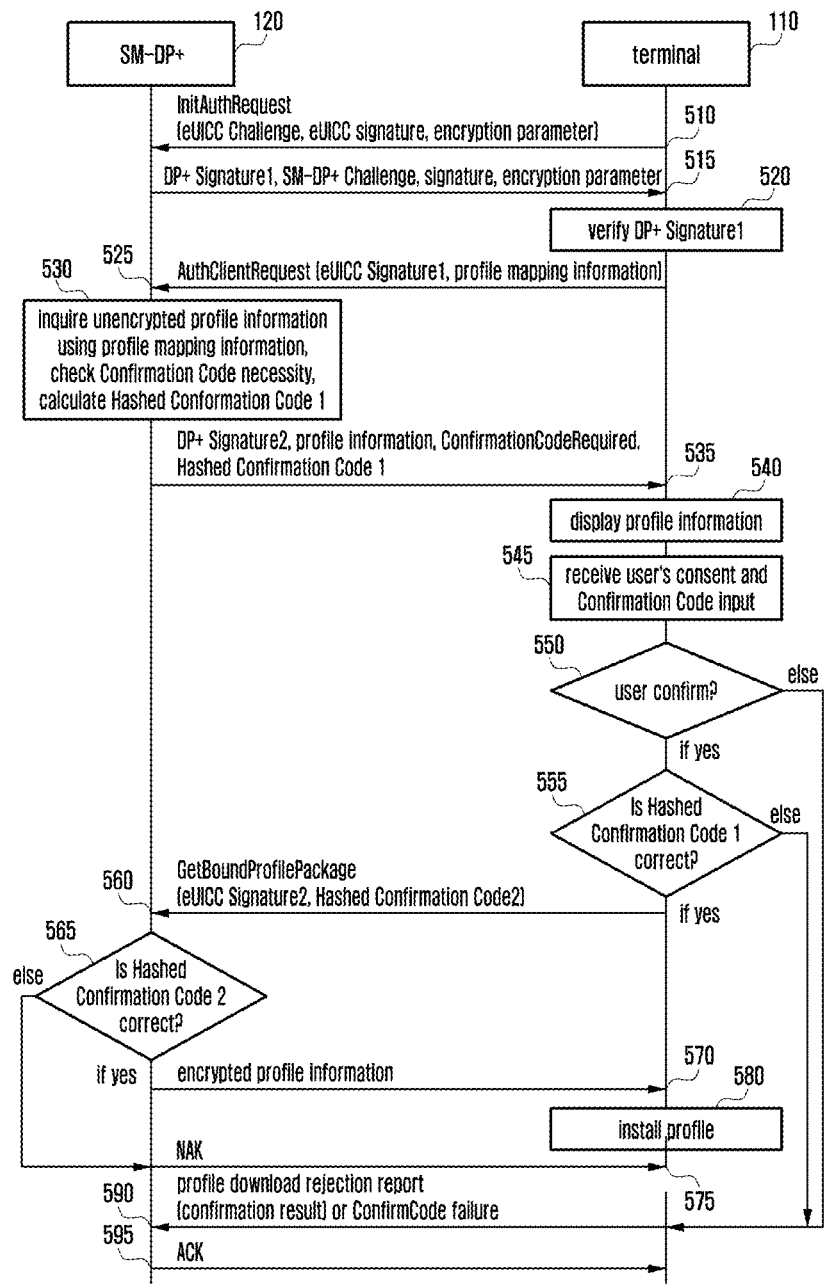
FIG. 5 is a signal flow diagram illustrating a profile download method according to another embodiment of the present invention.

FIG. 5 is a signal flow diagram illustrating a profile download method according to another embodiment of the present invention. In this embodiment, the terminal and the SM-DP+ exchange a signature and an encryption parameter for normal signature and encryption process during the profile download procedure.

In reference to FIG. 5, the terminal 110 may generate server verification information for verifying the server at step 510. The server verification information may be a random value, e.g., challenge value. The challenge value may be generated by the control unit of the terminal 110 or the eUICC 115 connected to the terminal 110 and may be called eUICC challenge value. The terminal 110 may send the profile provision server 120 a message including the server verification information, eUICC signature, and encryption parameter. This message may be an initial authentication request message (InitAuthRequest). The profile provision server 120 may be an SM-DP+. The eUICC signature and encryption parameter may be included in the eUICC information (eUICC Info) that is transmitted to the SM-DP+ 120. At this time, the eUICC challenge may be a signature creation algorithm, and the eUICC signature may be a signature verification algorithm.

The signature creation algorithm, the signature verification algorithm, and the encryption parameter may be notified to the SM-DP+ 120 indirectly instead of being transmitted directly as shown in the drawing of FIG. 5. For example, reference identification information may be defined between the terminal 110 and the SM-DP+ 120. In this case, the if the terminal 110 sends the SM-DP+ 120 a predetermined value according to the reference identification information value, the SM-DP+ 120 may check the signature creation algorithm, signature verification algorithm, and encryption parameter according to the received reference identification information value. For example, if the reference identification information is set to 1, the terminal 110 and the SM-DP+ 120 assume the signature creation algorithm of A, signature verification algorithm of B, and encryption parameter of C. At this time, if the terminal 110 sends the SM-DP+ 120 the reference identification information set to 1, the SM-DP+ 120 can check the signature creation algorithm, signature verification algorithm, and encryption parameter.

If the terminal 110 (or eUICC 115) determines to use specific information, the SM-DP+ 120 may check the signature creation algorithm, signature verification algorithm, and encryption parameter based on the specific information. For example, there may be an agreement between the terminal 110 and the SM-DP+ 120 to assume the use of a predetermined signature creation algorithm, signature verification algorithm, and encryption when the terminal 110 determines to use a specific parameter. At this time, if the terminal 110 notifies the SM-DP+ 120 of the use of the specific parameter, the SM-DP+ 120 may check the signature creation algorithm, signature verification algorithm, and encryption parameter based on the notification. For example, if the terminal 110 determines to use a certain Certificate Issuer (CI), the SM-DP+ 120 may check the signature creation algorithm, signature verification algorithm, and encryption parameter according to the CI information (CI-Info).

The SM-DP+ 120 may generate terminal verification information for verifying the terminal 110 at step 515. At this time, the terminal verification information may be a random value, e.g., SM-DP+ challenge value, which is generated by the control unit of the SM-DP+ 120. The SM-DP+ 120 may calculate a SM-DP+ signature for the data including the eUICC challenge value received at step 510 and the SM-DP+ challenge value generated by the SM-DP+ 120. At this time, the SM-DP+ signature may be SM-DP+ signature1.

Meanwhile, the SM-DP+ 120 may select the best signature and encryption parameter based on the eUICC signature and encryption parameter received at step 510. The SM-DP+ 120 may select the signature and encryption parameter to be used by the eUICC 115 and send them to the terminal 110 (or eUICC 115). If there is no supportable parameter in the information received from the eUICC 115, the SM-DP+ 120 may reject the request from the eUICC 115 and send a rejection message to the terminal 110.

The SM-DP+ signature1 may be calculated using the SM-DP+ secret key. The SM-DP+ 120 may send the terminal 110 a response message including the SM-DP+ signature1 and SM-DP+ challenge value. The response message may include the signature and encryption parameter for use by the eUICC 115.

Steps 520 to 595 are similar to steps 420 to 495 of FIG. 4; therefore, detailed descriptions thereof are omitted herein.

Figure 6A:
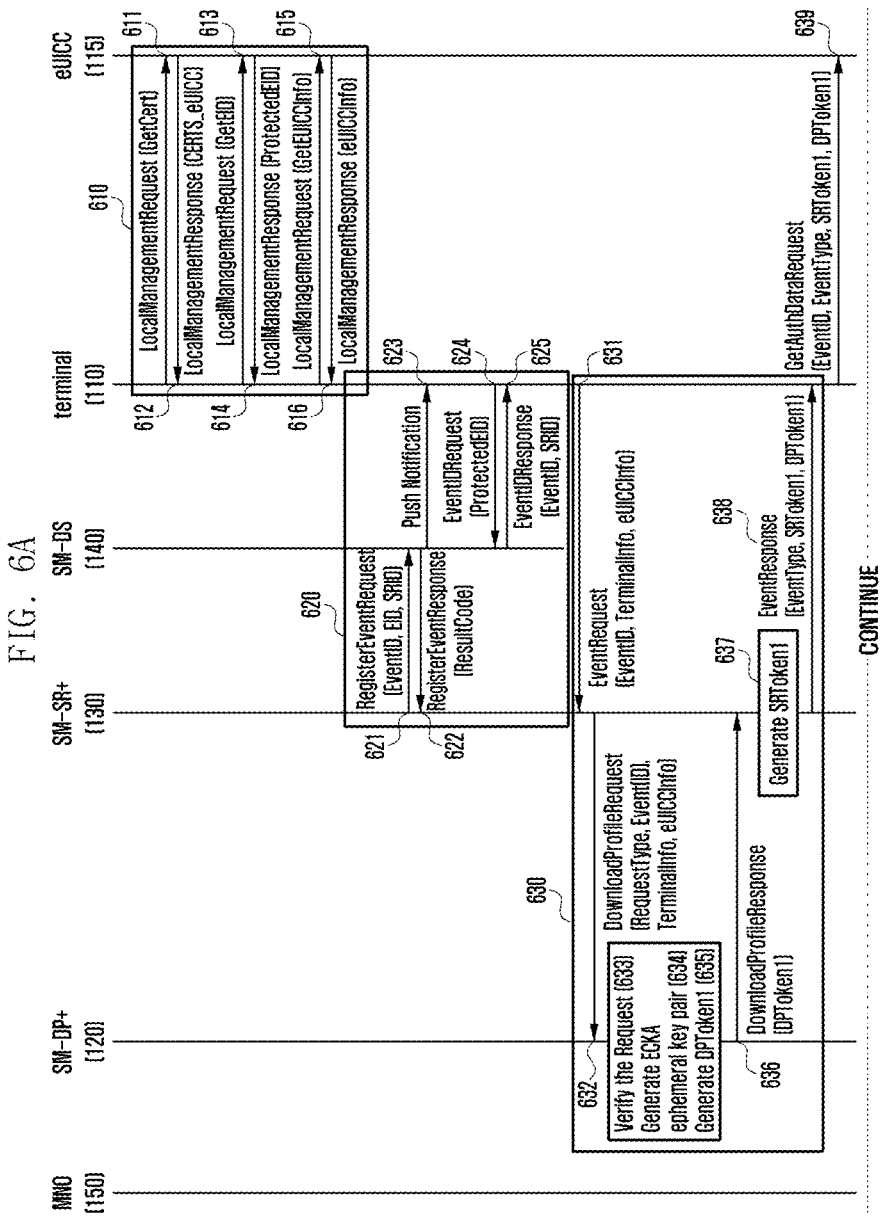
FIGS. 6A to 6C are a signal flow diagram illustrating a profile download method of the present invention according to an embodiment of the present invention.
Figure 6B:
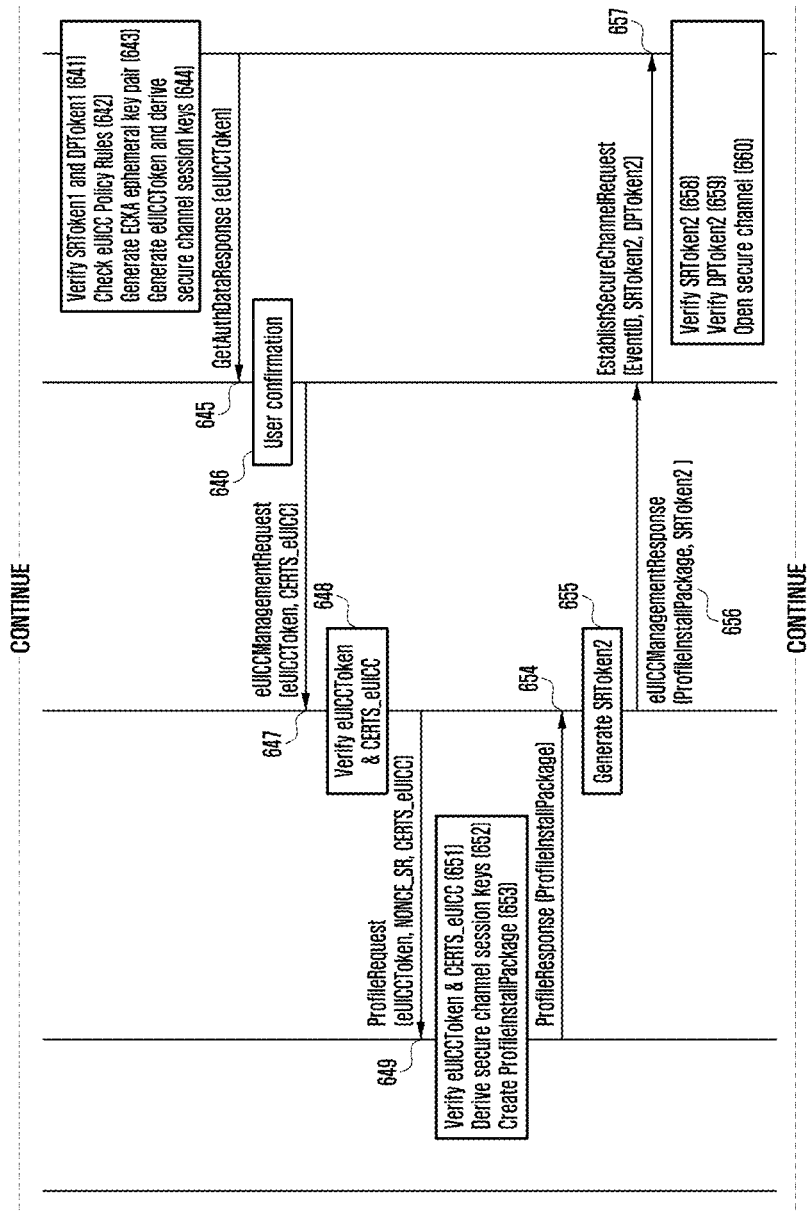
Figure 6C:
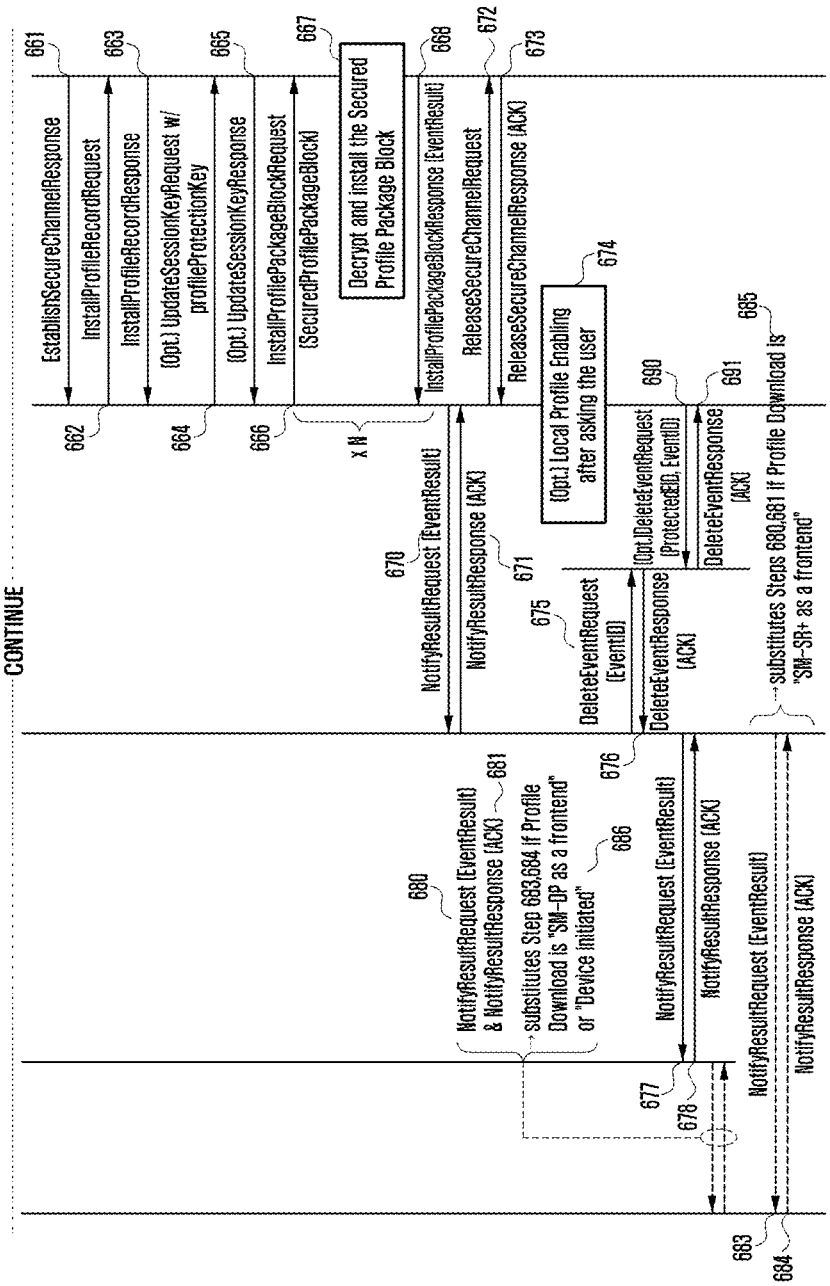

FIGS. 6A to 6C are a signal flow diagram illustrating a profile download method of the present invention according to an embodiment of the present invention.

In reference to FIGS. 6A to 6C, the terminal 110 inquires of the SM-DP+ 140 about information without exposure of the terminal identifier (e.g., EID) so as to secure private information during the profile download.

Processes 610 to 630 of FIGS. 6A TO 6C are performed conditionally as follows.

Process 610 may be omitted when the LPA (i.e., terminal 110) has an eUICC certificate (CERTS_eUICC), a protected EID obtained by hashing the EID, and eUICC information. Meanwhile, the terminal 110 includes the LPA and, in this embodiment, the LPA performs the operations of the terminal 110.

Process 620 may be performed when the profile management server (SM-SM+ 130) or the profile provision server (SM-DP+ 120) request to the MNO 150 for profile download with the indication of the profile associated with the SM-DS 140.

Process 630 may be omitted when the terminal 110 (LPA) has already received eventType, dpToken1, and srToken1 information.

The individual steps are described in detail hereinafter.

The terminal 110 may read the CERTS_eUICC from the eUICC 115 through steps 611 and 612. The CERTS_eUICC may include an eUICC certificate and an EUM certificate. In detail, the terminal 110 may send the eUICC 115 a LocalManagementRequest message including CERTS_eUICC request information (GetCert) at step 611 and receive a LocalManagementResponse message including the CERTS_eUICC from the eUICC 115 at step 612.

The terminal 110 may read a protected EID value from the eUICC 115 through steps 613 and 614. The protected EID may include at least one of the following information items:

Time information, EID or hashed EID value, ED-signed value

The hashed EID value or the ED-signed value may be calculated with the time information. In order to accomplish this, the terminal 110 may send the eUICC 115 a LocalManagementRequest message including the protected EID value request information (GetEID) and receive a LocalManagementResponse message including the protected EID value from the eUICC 115.

The terminal 110 may acquire eUICCInfo from the eUICC 115 through steps 615 and 616.

The eUICCInfo may include the information as follows:
Signature of eUICC and elliptical curve parameter for encryption,
Residual memory size of eUICC In detail, the terminal 110 may send the eUICC 115 a LocalManagementRequest message including eUICCInfo request information (GetEUICCInfo) at step 615 and receive a LocalManagementResponse message including the eUICCInfo from the eUICC 115 at step 616.

In the case that the eUICCManagementRequest, profile download request, or profile management request message includes indication information indicating profile download handling or profile management with the SM-DS 140, the SM-SR+ 130 or the SM-DP+ 120 may request to the SM-DS 140 for event registration through steps 621 and 622. In detail, the SM-SR+ 130 may send the SM-DS 140 a RegisterEventRequest message including profile mapping information (EventID), EID, and server ID (SRID) at step 621 and receive a RegisterEventResponse message including a result code (ResultCode) from the SM-DS 140 at step 622.

The SM-DS 140 may send the terminal 110 a push notification via a push server at step 623.

The terminal 110 may send the SM-DS 140 an EventID (profile mapping information) request message (EventIDRequest) including a protected EID at step 624. Then the SM-DS 140 may verify the protected EID. Particularly, if the time interval between the time point included in the protected EID and the time point when the EventID request message is received is greater than a predetermined range, the SM-DS 140 may fail in verifying the protected EID. The verification process may further include verifying validity of the hash value or signature value. If any of the verifications fails, the SM-DS 140 may not reply or may send the terminal 110 a response message including a response code corresponding to the cause of rejection.

The SM-DS 140 may send the terminal 110 one or more information pairs of EventID and server information (SRID) at step 625. The server address (SRID) includes the address of the server for processing the corresponding EventID, and the corresponding server may be the SM-DS 140, SM-DP+ 120, or SM-SR+ 130. According to an embodiment of the present invention, if there is no EventID, the SM-DS 140 may not transmit the EventID information. For convenience of explanation, it is assumed at step 631 that the server address is the address of the SM-DP+ 120 or SM-SR+ 130.

If the terminal 110 acquires the EventID and server address through the previous steps, the terminal 110 may request to the SM-SR+ 130 or SM-DP+ 120 for an EventID handling process. The EventID handling process may be one of downloading the profile, managing the profile remotely, managing the eUICC remotely, and returning other EventID and server address. At this time, the terminal 110 may request to the SM-SR+ 130 or SM-DP+ 120 to process the corresponding EventID with the terminal information (terminal Info) or eUICC information (eUICC Info). In the case that the terminal 110 makes a request to the SM-SR+ 130, the SM-DP+ 120 may add or delete to or from the request. The terminal information may include the IMEI of the terminal or part thereof.

In the case that the SM-SR+ 130 or the SM-DP+ 120 checks the terminal information or eUICC information, if at least one item of information is not supported by the SM-SR+ 130 or the SM-DP+ 120, the SM-SR+ 130 or SM-DP+ 120 may reject the corresponding request and end the procedure. For example, if the SM-SR+ 130 or the SM-DP+ 120 does not support the ECC signature parameter or the encryption parameter included in the eUICC information, it may reject the request. If the SM-SR+ 130 or the SM-DP+ 120 supports one or both of the ECC signature parameter and the encryption parameter included in the eUICC information, it may select the supportable parameter for use in signature verification, signature creation, and encryption.

If the SM-DP+ 120 receives the request from the SM-SR+ 130, the SM-DP+ 120 may verify at step 633 whether the SM-SR+ identifier included in the EventID and the SM-SR+ identifier included in the certificate of the SM-SR+ 130 match. At this time, the certificate of the SM-SR+ 130 may be a certificate for ECDSA signature.

The SM-DP+ 120 may create an asymmetric key pair (ECKA ephemeral key pair) for profile encryption at step 634.

The SM-DP+ 120 may create a DPToken1 at step 635. At this time, the DPToken1 may include at least one of the information items as follows:

| | |
|---|---|
| profileRecordPart1 | (including part of profile plain text information) |
| ePK_DP_ECKA | (public key of ephemeral asymmetric key pair) |
| sign_DP1 | (SM-DP+ signature1) |
| cert_DPE_ECDSA | (SM-DP+ certificate for signature) |
| cert_DP_ECKA | (SM-DP+ certificate for encryption) |
| confirmType | (user confirmation type) |
| confirmMessage | (message when user confirmation is acquired) |
| confirmCodeHash1 | (confirmation code hash value 1) |

Particularly, if the confirmType includes a value requiring user's confirmation code input, the SM-DP+ 120 may generate the confirmation code hash value 1.

If the SM-DP+ 120 that receives the confirmation code normally from the operator which has issued the confirmation code to the user sends the terminal 110 the normal confirmation code hash value 1, the terminal 110 may verify the SM-DP+ 120 based on the confirmation code input by the user to verify that the profile is not downloaded from an abnormal server.

Even though the confirmation code is fixed to a specific profile, the SM-DP+ 120, the SM-DP+ 120 may generate a unique confirmation code hash value 1 every time. For example, the SM-DP+ 120 may generate the confirmation code hash value 1 as follows:

confirmCodeHash1 generated by SM-DP+
120=SHA256(ePK_DP_ECKA|confirm code)

At this time, the confirmation code may be a value that the SM-DP+ 120 receives from the operator.

The confirmation code hash value 1 generated in this way is sent to the terminal 110; thus, if the confirmation code input by the user does not match the information sent by the SM-DP+ 120, the profile download is blocked at the terminal 110. At this time, the terminal 110 may compare the received confirmation code hash value 1 with the confirmation code hash value 1 calculated by itself. According to an embodiment of the present invention, the confirmation code hash value calculated by the terminal 110 may be a result value of SHA256 (ePK_DP_ECKA confirmCode) formula with the confirmation code input by the user and the ePK_DP_ECKA value received from the SM-DP+ 120.

It may also be possible for the SM-DP+ 120 and the terminal 110 to generate the confirmCodeHash1 value using another formula, but even in this case the confirmation code and the value that is uniquely generated every time are used as factors. For example, the confirmCodeHash1 may be generated using the equation:

confirmCodeHash1=SHA256(ePK_DP_ECKA-|SHA256(confirmCode)).

The SM-DP+ 120 may send the SM-SR+ 130 a response message including DPToken1 at step 636. At this time, the response message may be ES3_DownloadProfileResponse.

The SM-SR+ 130 may generate SRToken1 at step 637.

At this time, the SRToken1 may include at least one of the following information items:
SM-SR+ certificate
One-time random value
SM-SR+ signature value At this time, the one-time random value may be used to protect the terminal 110 against a replay attack made by reusing the signature value. Afterward, the SM-SR+ 130 may use the one-time random value for verifying the signature of the terminal 110 to authenticate the terminal 110.

The SM-SR+ 130 may send the terminal 110 a response message at step 638. At this time, the response message may be ES9_EventResponse.

The ES9_EventResponse may include at least one of the following information items:
resultCode
eventType
srToken1
dpToken1

The eventType denotes the information on the download profile (downloadProfile) and, according to an embodiment of the present invention, includes the DPToken1.

If the EventID included in the ES9_EventRequest received at step 631 is invalid, the SM-SR+ 130 may send the terminal 110 an ES9_EventResponse including the resultCode containing error information. The SM-SR+ 130 may send the SM-DS 140 an ES12_DeleteEventRequest including the EventID at step 675.

The terminal 110 may send the eUICC 115 an authentication data request message at step 639. The authentication data request message may be ES10_GetAuthDataRequest.

The ES10_GetAuthDataRequest may include at least one of the following information items:
eventID
eventType
srToken1
dpToken1
terminalType
provisioningType The terminalType information may include terminal identity information as follows:

TerminalType ::= ENUMERATED {
    without_UI (0),
    with_UI (1)
}

The provisioningType information may include the information indicating whether the SM-DS 130 is involved or not in the profile download procedure.

ProvisioningType ::= ENUMERATED {
    without_SM-DS (0),
    with_SM-DS (1)
}

If the eventType is set to "downloadProfile", the ES10_GetAuthDataRequest message may include dpToken1, terminalType, and provisioningType.

The eUICC 115 may verify the srToken1 at step 641.

At this time, the verification process may be performed as follows. The eUICC 115 may verify the CERT_SR_ECDSA using the PK_CI_ECDSA. The eUICC 115 may extract the PK_SR_ECDSA from the CERT_SR_ECDSA and verify the SIGN_SR1 with the PK_SR_ECDSA and NONCE_SR. The eUICC 115 may store the PK_SR_ECDSA and NONCE_SR along with the eventID for use later at step 659.

If the eventType is set to "downloadProfile", the eUICC 115 may create and identify a security domain for storing the profile.

Afterward, the eUICC 115 may verify the dpToken1.

The verification process may be performed as follows. The eUICC 115 may verify the CERT_DP_ECDSA using the PK_CI_ECDSA. The eUICC 115 may extract the PK_DP_ECDSA from the CERT_DP_ECDSA and verify the SIGN_DP1 with the PK_DP_ECDSA and ePK_DP_ECKA. The eUICC 115 may verify the CERT_DP_ECKA using the PK_CI_ECDSA. The eUICC 115 may extract the PK_DP_ECKA from the CERT_DP_ECKA. Afterward, the eUICC 115 may store the PK_DP_ECDSA, PK_DP_ECKA, and ePK_DP_ECKA for use later at step 659. The eUICC 115 may also store the profileRecordPart1 for use later at step 662.

If any of the verifications fails, the eUICC 115 may send the terminal 110 an error message.

If the srToken1 and dpToken1 are verified successfully, at step 642 the eUICC 115 may have the verified information such as SRID, DPID, EventID, EventType, Target EID, ProfileType, ProfileDescription, PLMNID of MNO, TerminalType, ConfirmType, and ProvisioningType.

With such information, the eUICC 115 may determine whether to continue the profile download procedure as follows:
  The eUICC 115 may verify whether the SRID included in the CERT_RR_ECDSA is permitted according to the eUICC's configuration.
  The eUICC 115 may verify whether the DPID included in the CERT_DP_ECDSA is permitted according to the eUICC's configuration.
  The eUICC 115 may verify whether the PLMNID is permitted according to the eUICC's configuration.
  If the TerminalType is set to "without_UI", the eUICC 115 may verify whether the ConfirmType is yesOrNo.
  If the TerminalType is set to "with_UI", the ConfirmType is set to "yesOrNo", and the ProvisioningType is set to "with_SM-DS", the eUICC 115 may verify whether the PLMNID is permitted according to the eUICC's configuration.
  If all of the verifications succeed, the eUICC 115 may continue the profile download procedure.
  If any of the verifications fails, the eUICC 115 may reject the event and send a response message including the cause of rejection.

The eUICC 115 may create a pair of an ephemeral public key (ePK_eUICC_ECKA) and an ephemeral private key (eSK_eUICC_ECKA).

The eUICC 115 may store the ePK_eUICC_ECKA, eSK_eUICC_ECKA, PK_SR_ECDSA, PK_DP_CDSA, and NONCE_SR along with the EventID.

The eUICC 115 may create an eUICC token (EUICCToken) at step 644.

At this time, the EUICCToken may include at least part of the information as follows:

| | |
|---|---|
| eventID | |
| sign_eUICC | (signature created by eUICC) |
| nonce_eUICC | (one-time random value generated by eUICC) |
| ePK_eUICC_ECKA | (public key of ephemeral asymmetric key pair generated by eUICC) |
| eUICCInfo | EUICCInfo |

The eUICC signature (sign_eUICC) may be calculated with SK_eUICC_ECDSA.

The NONCE_SR is included in the calculation for the SM-SR+ 130 to authenticate the eUICC 115, and the ePK_DP_ECKA is included in the calculation for the SM-DP+ 120 to authenticate the eUICC 115.

The eUICC 115 may generate and store session keys for use later at step 660. At this time, the Receipt may be generated along with the session keys. The Receipt may be used as the initial MAC chaining value for the first SCP03t CommandTLV.

The eUICC 115 may send the terminal 110 an ES10_GetAuthDataResponse message at step 645.

The ES10_GetAuthDataResponse message may include at least one of the following information items:

| | |
|---|---|
| resultCode | result code |
| eUICCToken | |

If the resultCode included in the ES10_GetAuthDataResponse message received at step 645 is set to "reject", the terminal 110 may send the SM-SR+ 130 a ES9_NotifyResultRequest message at step 670. The ES9_NotifyResultRequest message transmitted to the SM-SR+ 130 may include the same result code as the ES10_GetAuthDataResponse message (EventResult information included in the message of step 670). Otherwise, if the resultCode included in the ES10_GetAuthDataResponse message received at step 645 is set to "success", the terminal 110 may ask the user for confirmation at step 646

If the dpToken1.confirmType is set to "yesOrNo", the terminal 110 may present necessary information such as eventType and profileRecordPart1 to the user to ask for explicit consent for execution of the eUICC management event.

If the dpToken1.confirmType is set to "codeInput", the terminal 110 may ask the user for the confirmation code received from the MNO 150 during the subscription process. The terminal 110 may verify whether the received dpToken1.confirmCodeHash1 is correct using the following formula:

SHA256(dpToken1.ePK_DP_ECKA confirmCode input by user)

If the verification succeeds, the SM-DP+ 120 may send the SM-SR+ 130 an error message.

If the ES9_EventResponse message includes the dpToken1.confirmMessage, the terminal 110 may present the above message to the user when asking for confirmation.

Exceptionally, if the terminal 110 is an M2M device without a UI and the confirmType is set to "yesOrNo", the terminal 110 may omit the user confirmation process.

If the user accepts the profile download, the terminal 110 may send the SM-SR+ 130 an ES9_eUICCManagementRequest message at step 647.

The ES9_eUICCManagementRequest message may include at least part of the information as follows:

| | |
|---|---|
| eUICCToken | |
| confirmCodeHash2 | onfirmation hash code value 2 calculated by terminal |
| certs_eUICC | CERTS_eUICC |

At this time, the confirmCodeHash2 may be calculated by the terminal 110 as follows.

SHA256(ePK_eUICC_ECKA|ePK_DP_ECKA confirmCode input by the user)

Otherwise, if the user rejects the profile download, the terminal 110 may send the SM-SR+ 130 an ES9_NotifyResultRequest message at step 670. At this time, the ES9_NotifyResultRequest message may include the resultCode set to "User_Rejected" and a corresponding eventID.

The SM-SR+ 130 may verify the eUICCToken and CERTS_eUICC at step 648.

The verification process may be performed as follows. The SM-SR+ 130 may verify the CERT_eUICC_ECDSA using the CERT_CI_ECDSA stored in the SM-SR+ 130 and the CERT_EUM_ECDSA delivered in the CERTS_eUICC.

The SM-SR+ 130 extracts the PK_eUICC_ECDSA from the CERT_eUICC_ECDSA and verifies the sign_eUICC using the PK_eUICC_ECDSA, ePK_DP_ECKA, and NONCE_SR. The SM-SR+ 130 may use the ePK_DP_ECKA and NONCE_SR values stored along with the eventID.

If any of the verifications fails, the SM-SR+ 130 may send the terminal 110 and the SM-DP+ 120 an error value.

If all of the verifications succeed, this may mean that the SM-SR+ 130 authenticates the eUICC 115 successfully.

The SM-SR+ 130 may send the SM-DP+ 120 a ProfileRequest message at step 649.

The ES3_ProfileRequest message may include at least part of the information as follows:
eUICCToken
nonce_SR
confirmCodeHash2
certs_eUICC The SM-DP+ 120 may verify the eUICCToken and CERTS_eUICC at step 651.

The verification process may be performed as follows. The SM-DP+ 120 may verify the CERT_eUICC_ECDSA and CERT_eUICC_ECKA using the CERT_CI_ECDSA stored in the SM-DP+ 120 and the CERT_EUM_ECDSA delivered in the CERTS_eUICC.

The SM-DP+ 120 may extract the PK_eUICC_ECDSA from the CERT_eUICC_ECDSA and verify the sign_eUICC using the PK_eUICC_ECDSA, ePK_DP_ECKA, and ONCE_SR. The SM-DP+ 120 may use the ePK_DP_ECKA stored along with the eventID and the NONCE_SR received from the SM-SR+ 130 at step 649.

Next, the SM-DP+ 120 may extract the PK_eUIC-C_ECKA from the CERT_eUICC_ECKA.

If the event.userConfirmation.confirmType is set to "codeInput", the SM-DP+ 120 may verify whether the received ES3_ProfileRequest.confirmCodeHash2 is correct using the following formula:

SHA256 (eUICCToken.ePK_eUICC_ECKA | ePK_DP_ECKA | event.userConfirmation.confirmCode)

If any of the verifications fails, the SM-DP+ 120 may send the SM-SR+ 130 an error value.

If all of the verifications succeed, this may mean that the SM-DP+ 120 authenticates the eUICC 115 successfully.

The SM-DP+ 120 may derive the SCP03t AES session keys from the PK_eUICC_ECKA, SK_DP_ECKA, ePK_eUICC_ECKA, and eSK_DP_ECKA at step 652.

The SCP03tSessionKey may include at least part of the information as follows:

| | |
|---|---|
| sENC | encryption key for encrypting outbound information |
| sMAC | integrity protection key for outbound information |
| sRMAC | integrity protection key for inbound information |

The SM-DP+ 120 may generate a ProfileInstallPackage at step 653.

The ProfileInstallPackage may include at least part of the information as follows:

| | |
|---|---|
| dpToken2 | |
| DPToken2, | |
| profileProtectionKey | encryption key modification key |
| securedProfilePackage | encrypted profile |

The DPToken2 may include the following information:

| | |
|---|---|
| sign_DP2 | SIGN_ECDSA |

The sign_DP2 is a signature generated by the SM-DP+ 120.

The profileProtectionKey is an optional SCP03tCommand TLV including pre-generated SCP03t AES keys. The pre-generated SCP03t AES keys may be used for securing the SecuredProfilePackage. The TLC may be protected with the SCP03t session keys received at step 652.

The SM-DP+ 120 may send the SM-SR+ 130 an ES3_ProfileResponse message at step 654.

The ES3_ProfileResponse message may include the following information:

| | |
|---|---|
| resultCode | ResultCode, |
| profileInstallPackage | ProfileInstallPackage |

The SM-SR+ 130 may generate an srToken2 at step 655. The srToken2 may include the following information:

| | |
|---|---|
| sign_SR2 | SIGN_ECDSA |

The signature sign_SR2 may be calculated with the SK_eUICC_ECDSA.

The SM-SR+ 130 may send the terminal 110 an ES9_eUICCManagementResponse message at step 656.

The ES9_eUICCManagementResponse message may include the following information:

| | |
|---|---|
| resultCode | ResultCode, |
| profileInstallPackage | ProfileInstallPackage OPTIONAL, |
| srToken2 | SRToken2 |

The terminal 110 may send the eUICC 115 an ES10_EstablishSecureChannelRequest message at step 657.

If the eUICC 115 receives the ES10_EstablishSecureChannelRequest, it may verify the srToken2 first at step 658.

The verification process may be performed as follows. The eUICC 115 may verify the sign_SR2 with the SR_ECDSA.

If the verification fails, the eUICC 115 may send the terminal 110 an error value.

If the verification succeeds at step 685, the eUICC 115 may verify the dpToken2 at step 659.

The verification process may be performed as follows. The eUICC 115 may verify the sign_DP2 with the PK_DP_ECDSA.

The eUICC 115 may verify the SIGN_DP2 using the ePK_eUICC_ECKA, NONCE_SR, and PK_DP_ECDSA values stored along with the EventID at step 641.

The eUICC 115 may verify the CERT_DP_ECKA with the PK_CI_ECDSA stored therein.

Next, the eUICC 115 may extract the PK_DP_ECKA from the CERT_DP_ECKA.

The eUICC 115 may check whether the DPID stored in the CERT_DP_ECKA is identical with the DPID stored in the CERT_DP_ECDSA.

If any of the verifications fails, the eUICC 115 may send the terminal 110 an error message.

If all of the verifications succeed, this may mean that the eUICC 115 is verified successfully by the SM-DP+ 120 and the SM-SR+ 130.

If the verification fails at step 659, the eUICC 115 may open, at step 660, a secure channel using the SCP03t session keys generated at step 644 (i.e., the eUICC 115 can decrypt the SCP03tCommandTLV after this step.)

After generating the session keys, the eUICC 115 may send the terminal 110 the ES10_EstablishSecureChannelResponse TLV at step 661.

The terminal 110 may send the eUICC 115 an ES10_InstallProfileRecordRequest message at step 662.

The eUICC 115 may decrypt the securedProfileRecord-Part2 with the profileRecordPart2. The eUICC 115 may combine the profileRecordPart1 and profileRecordPart2 acquired from the DPToken1 at step 641 to generate ProfileRecord in the ProfileRegistry.

The eUICC 115 may return an ES10_InstallProfileRecordResponse message to the terminal 110 at step 663.

Step 664 is an optional step in which, if the ProfileInstallPackage message including the profileProtectionKey TLV is delivered from the SM-SR+ 130/SM-DP+ 120, the terminal 110 may send the eUICC 115 an ES10_UpdateSessionKeyRequest message carrying the profileProtectionKey.

If the ES10_UpdateSessionKeyRequest message is received, the eUICC 115 may decrypt the profileProtectionKey with the SCP03tSessionKey and replace the SCP03t session keys with the decrypted SCP03tSessionKey. The updated SCP03t session keys may be used to protect the subsequent SCP03tCommandTLVs through the established secure channel.

If the session keys are updated by the ES10_UpdateSessionKeyRequest message, the first subsequent SCP03tCommandTLV may include the C-MAC. The C-MAC may be calculated with a "MAC chaining value" so as to be set to 16 bytes "0x00".

Step 665 is an optional step in which the eUICC 115 may return an ES10_UpdateSessionKeyResponse message to the terminal 110 after step 664.

The terminal 110 may send the eUICC 115 an ES_InstallProfilePackageBlockRequest message at step 666.

The eUICC 115 may decrypt the securedProfilePackageBlock with the session keys at step 667. The decrypted ProfilePackageBlock may include one or more Profile Elements (PEs) and/or parts of the PEs. The parts of the PEs may be combined with the previously stored part(s) of the PE to form a single complete PE. If the decryption and possible combinations result in one or more complete PEs, the eUICC 115 may install the PEs in order. The remaining and/or incomplete PE(s) may be stored in the eUICC 115 for future use.

After processing the ProfilePackageBlock, the eUICC 115 may send the terminal 110 an ES10_InstallProfilePackageBlockResponse message at step 668.

Steps 666 to 668 may be repeated until the last ProfilePackageBlock is transmitted. If the ES10_InstallProfilePackageBlockRequest message includes the lastPBIndicator set to lastPB (1) and all PEs are successfully installed, the eUICC 115 generates the ES10_InstallProfilePackageBlockResponse message including the eventResult as well as the resultCode and the ProfileRecord for the profile in the ProfileRegistry.

If the ES10_InstallProfilePackageBlockResponse message including the eventResult is received from the eUICC 115, the terminal 110 may send the SM-SR+ 130 an ES9_NotifyResultRequest message including the eventResult generated by the eUICC 115 at step 670. If the ES10_InstallProfilePackageBlockResponse message is received along with the eventResult from the eUICC 115, the terminal 110 may send the SM-SR+ 130 an ES9_NotifyResultRequest message including the eventResult generated by the eUICC 115.

The ES9_NotifyResultRequest message may include the information as follows:

| eventResult | (processing result of eUICC) |
|---|---|
| cert_EUM_ECDSA | (EUM certificate) |
| resultCode | (result code) |

The EventResult may include the information as follows.

| resultCode | |
|---|---|
| eID | |
| eventID | |
| profileID | profile identifier |
| sign_Result eUICC | processing result signature value generated by |

The SM-SR+ 130 may respond with the following TLV. If the SM-SR+ 130 is not aware of the eventID in the eventResult transmitted by the terminal 110, the SM-SR+ 130 may send the terminal 110 an error message along with the corresponding resultCode.

The ES9_NotifyResultResponse message may include the information as follows:

| resultCode | ResultCode |
|---|---|

If a result notification is received from the terminal 110, the SM-SR+ 130 may send the result to the MNO 150 and/or SM-DP+ 120 (see steps 680, 681, 683, 684, 685, and 686). If the result notification is set to "success", the SM-SR+ 130 may delete the EventID from its database in order not to repeat processing the same event. If the event is not deleted successfully in the SM-DS 140, it may be fetched again by the terminal 110 when the terminal requests to the SM-SR+ 130 for the same event.

It is recommended that when the EventIDs are successfully completed the eUICC 115 stores and maintains the EventIDs. As a consequence, the eUICC 115 may control the situation in which a completed event is not deleted successfully from the databases of the SM-DS 140 and the SM-SR+ 130 and thus the same event is initiated to the eUICC 115 (see steps 690 and 691). The eUICC 115 may recognize this and return the failure.

If the established secure channel is required no longer, the terminal 110 may send the eUICC 115 an ES10_ReleaseSecureChannelRequest message at step 672. The ES10_ReleaseSecureChannelRequest message may include the information indicating release of the secure channel and related session keys.

If the ES10_ReleaseSecureChannelRequest message is transmitted, the eUICC 115 may release the secure channel and related session keys at step 673 and then send the terminal 110 an ES10_ReleaseSecureChannelResponse message in reply.

In the case that the secure channel is released, the eUICC 115 may send an error message when an SCP03tCommandTLV is received without any information indicating reestablishment of a new secure channel.

Step 674 is an optional step in which the terminal 110 may ask the user to enable the installed profile. If the user accepts enabling the profile, the terminal 110 may perform a local Profile Enabling procedure.

If the ES9_NotifyResultRequest message transmitted by the terminal 110 indicates successful installation of the profile, at step 675 the SM-SR+ 130 may send the SM-DS 140 an ES12_DeleteEventRequest message including the EventID of the download profile event. The SM-DS 140 may delete the EventID stored at step 620 and related parameters from its database.

The ES12_DeleteEventRequest message may include the information as follows:

| eventID | EventID |
|---|---|

The SM-DS 140 may respond to the next TLV at step 676. If the SM-DS 140 is not aware of the eventID in the ES12_DeleteEventRequest message, the SM-DS 140 may send the SM-SR+ 130 a failure message including a resultCode.

The response message transmitted from the SM-DS 140 to the SM-SR+ 130 may be the ES12_DeleteEventResponse, which may include the information as follows:

| | |
|---|---|
| resultCode | ResultCode |

The SM-SR+ 130 may send the SM-DP+ 120 an ES3_NotifyResultRequest message at step 677. The ES3_NotifyResultRequest message may include the eventResult generated by the eUICC 115. The ES3_NotifyResultRequest message may inform the SM-DP+ 120 of the download and installation result of the ProfilePackage transmitted by the SM-DP+ 120.

The ES3_NotifyResultRequest message may include the information as follows:

| | | | |
|---|---|---|---|
| eventResult | EventResult | OPTIONAL, /* | conditional if |
| ES9_NotifyResultRequest | | | |
| | contains eventResult */ | | |
| resultCode | ResultCode | OPTIONAL | -- otherwise |

The SM-DP+ 120 may respond to the next TLC at step 678. If the SM-DP+ 120 is not aware of the eventID in the eventResult, the SM-DP+ 120 may send the SM-SR+ 130 a failure message including the resultCode.

The response message transmitted from the SM-DP+ 120 to the SM-SR+ 130 may be an ES3_NotifyResultResponse message, which may include the information as follows:

| | |
|---|---|
| resultCode | ResultCode |

If the profile download is requested by the terminal 110 or the SM-DP+ 120 via the MNO 150, the SM-DP+ 120 may send the MNO 150 an ES2_NotifyResultRequest message at step 680. Alternatively, if the profile download is requested by the terminal 110 or the MNO 150 via the SM-SR+ 130, the SM-SR+ 130 may send the MNO 150 an ES4_NotifyResultRequest message at step 683. The NotifyResultRequest message interface of the ES2 or ES4 may include the eventResult generated by the eUICC 115.

The ES2_NotifyResultRequest message may include at least one of the following information items:
eventResult,
resultCode The ES4_NotifyResultRequest message may include at least part of the information as follows:

| |
|---|
| eventResult |
| cert_eUICC_ECDSA |
| cert_EUM_ECDSA |
| resultCode |

The MNO 150 may transmit the next TLV at step 681 or 684.

The ES2_NotifyResultResponse message transmitted at step 681 may include the information as follows:

| | |
|---|---|
| resultCode | ResultCode |

The ES4_NotifyResultResponse message transmitted at step 684 may include the information as follows:

| | |
|---|---|
| resultCode | (result code) |

Step 690 is an optional step in which the terminal 110 may send the SM-DS 140 an ES11_DeleteEventRequest message including the EventID and ProtectedEID included in the download Profile event.

The ES11_DeleteEventRequest message may include at least part of the information as follows:

| |
|---|
| protectedEID or EID |
| eventID |

The SM-DS 140 may verify the protectedEID and eventID at step 691. If the protectedEID.sign_eID is valid and the eventID is issued for the eUICC 115, the SM-DS 140 may delete the corresponding event from the database. The SM-DS 150 may send the terminal 110 the processing result of the ES11_DeleteEventResponse message.

The ES11_DeleteEventResponse message may include the information as follows:
resultCode If the SM-SR+ 130 omits this step unintentionally and/or fails in deleting the event, the terminal 110 may avoid unnecessarily receiving notification of an event processed already.

Through the steps of the embodiment of FIG. 6A to 6C, the aforementioned parameters and messages can be generated more efficiently than being generated at specific steps or pre-generated and stored before specific steps.

Figure 7A:
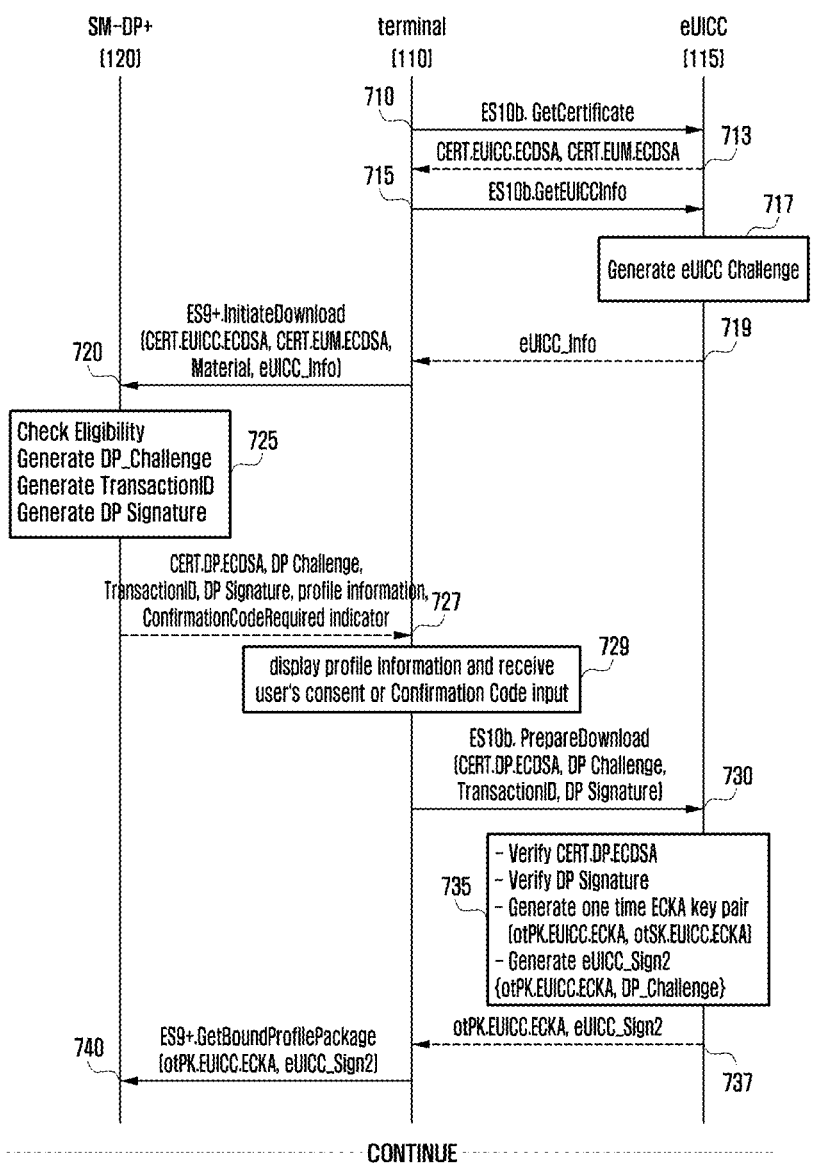
FIGS. 7A and 7B are a signal flow diagram illustrating a procedure of downloading a profile in an eUICC according to an embodiment of the present invention.
Figure 7B:
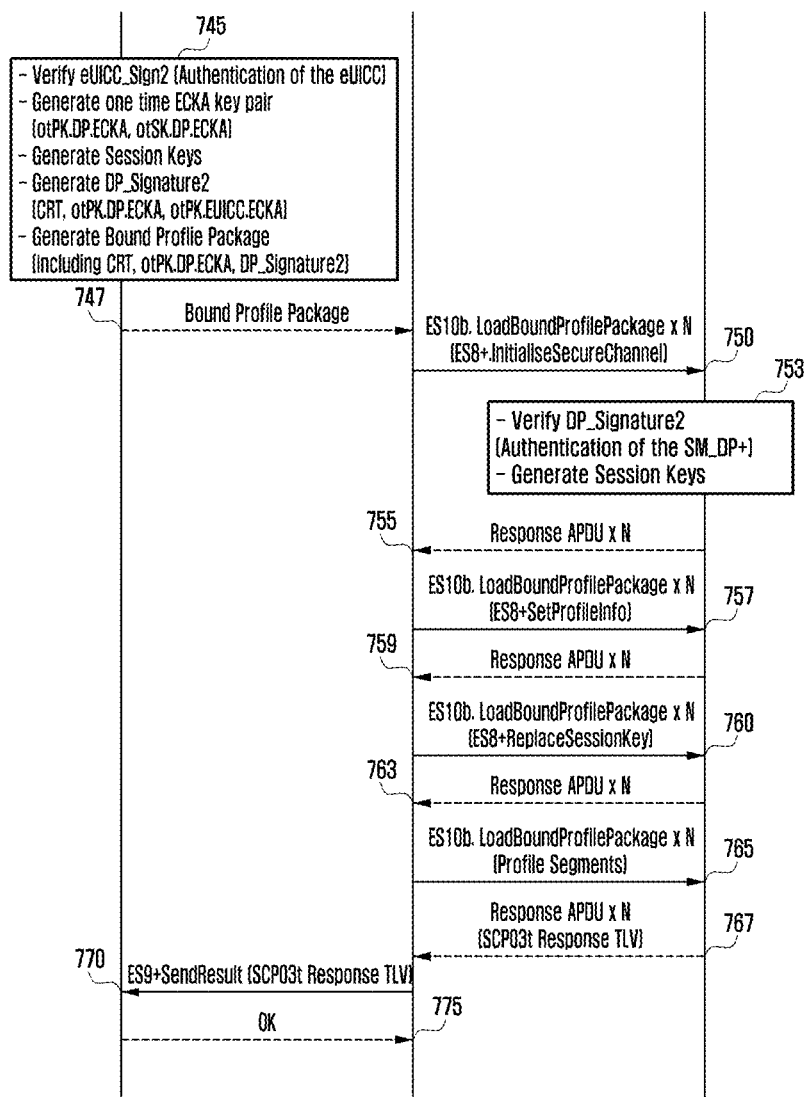

FIGS. 7A and 7B are a signal flow diagram illustrating a procedure of downloading a profile in an eUICC according to an embodiment of the present invention.

In reference to FIGS. 7A and 7B, the SM-DP+ 120 may directly communicate with the LPA (i.e., terminal 110) using a common IP based-HTTPS without involvement of the SM-SR+ 130.

The SM-DP+ 120 may store a signature certificate (CERT.DP.ECDSA) and private key (SK.DP.ECDSA) in an internal storage. The SM-DP+ 120 may store the TLS server certificate (CERT.DP.TLS) and the private key (SK.DP.TLS) for HTTPS in the internal storage. The storages for storing the CERT.DP.ECDSA, SK.DP.ECDSA, and CERT.DP.TLS, SK.DP.TLS may be physically identical with or different from each other.

The eUICC 115 may store its signature certificate (CERT.EUICC.ECDSA) and the private key (SK.eUICC.ECDSA) in the internal storage. The profile download procedure may be performed as follows.

710

The terminal 110 may request to the eUICC 115 for an eUICC certificate at step 710. Then the eUICC 115 may send the terminal 110 an eUICC certificate (CERT.eUICC.ECDSA) and an EUM certificate (CERT.EUM.ECDSA) at step 713.

At this time, if the terminal 110 has the certificates, steps 710 and 713 may be omitted.

If it is necessary to send the certificate values of the eUICC 115 to a server (SM-DP+ 120), the terminal 110 may request to the eUICC 115 to generate certificate values at step 715. The factors required for the signature may be the values delivered to the terminal 110 and include at least part of the information as follows:
EventID (identifier for identifying specific profile download event)
NotificationID (similar to EventID)
MatchingID (similar to EventID)
Activation Code Token (similar to EventID)
random value generated by terminal If the signature value of the eUICC 115 is not required, the terminal 110 may request to the eUICC 115 for eUICC information (UICC info) with the exception of the signature value of the eUICC 115.

The eUICC 115 may generate its signature value using the SK.eUICC.ECDSA at step 717.

The eUICC 115 may send the terminal 110 the eUICC signature value at step 719. If the eUICC signature value is not required, the eUICC 115 may return only the eUICC Info to the terminal 110. The eUICC Info may include the version information of the eUICC 115.

The terminal 110 may send the SM-DP+ 120 an ES9+.InitiateDownload message at step 720. At this time, a HTTPS session may be established between the terminal 110 and the SM-DP+ 120 for transmitting the ES9+.InitiateDownload message. The HTTPS session may be identical with or separate from the session for the whole profile download procedure.

The ES9+.InitiateDownload message may be the ES9.InitiateAuthentication message or the ES9.EventRequest message.

The ES9+.InitiateDownload message may include the eUICC Info and additionally the eUICC challenge. If the eUICC signature value is included, the eUICC certificate and the EUM certificate may also be included.

If the SM-DP+ 120 receives the eUICC certificate and signature values at step 720, the SM-DP+ 120 may verify the EUM certificate using the CI certificate or CI certificate public key (PK.CI.ECDSA), verify the eUICC certificate using the EUM certificate, and verify the eUICC signature value using the eUICC certificate. According to an embodiment of the present invention, the certificate and signature verifications may be omitted.

The SM-DP+ 120 may check the eligibility of the eUICC 115 based on the eUICC Info. At this time, the eUICC version information of the eUICC Info may be used.

The SM-DP+ 120 may generate a DP challenge. The DP challenge may be a value generated by the SM-DP+ 120 for future authentication of the eUICC 115.

The SM-DP+ 120 may generate a TransactionID. The TransactionID is an identifier for identifying a specific profile download session in order to make it possible to process a plurality of terminal requests simultaneously. If not identified by the TransactionID, the SM-DP+ 120 may download the profile for one terminal at a time; thus, when a certain terminal 110 delays responding to the SM-DP+ 120, other terminals also cannot download profiles. In order to solve this problem, it may be possible for the SM-DP+ 120 to configure a life time of a session in order to release the session after the expiry of the corresponding time period, but this approach may cause a performance problem of the SM-DP+ 120.

If the SM-DP+ 120 may receive a MathchingID or an EID from the terminal, the SM-DP+ 120 may check whether there is any downloadable profile corresponding to the MatchingID or EID.

The SM-DP+ 120 may calculate the EP signature value using the SK.DP.ECDSA for the data including the eUICC Challenge, DP Challenge, and TransactionID values.

The DP signature value may be a signature value for the eUICC 115 to authenticate the SM-DP+ 120.

At step 727, the SM-DP+ 120 may send the terminal 110 the signature certificate (CERT.DP.ECDSA) of the SM-DP+ 120, DP challenge, TransactionID, DP signature, profile information, and confirmation code input requirement indicator (ConfirmationCodeRequired identifier) in response to the message received at step 720.

In this case, the terminal 110 may display the profile information and receive a user's confirmation or confirmation code input at step 729.

If the aforementioned information items are received at step 727, the terminal 110 may send the eUICC 115 an ES10b.PrepareDownload message at step 730. The ES10b.PrepareDownload message may be the ES10.GetAuthDataRequest message.

The ES10b.PrepareDownload message may include CERT.DP.ECDSA, DP Challenge, TransactionID, and DP Signature.

The eUICC 115 may verify the DP certificate (CERT.DP.ECDSA) using the CI certificate or CI public key stored therein at step 735.

If the certificate verification succeeds, the eUICC 115 may verify the SM-DP+ signature value (DP-Signature).

At this time, the SM-DP+ signature verification is made with the DP challenge and TransactionID received from the terminal 110, the eUICC challenge transmitted from the eUICC 115 to the terminal 110, and the SM-DP+ public key (PK.DP.ECDSA) included in the CERT.DP.ECDSA.

If the verification succeeds, the eUICC 115 may generate a one-time asymmetric key pair.

The eUICC 115 may load and use a previously generated one-time asymmetric key pair in the cases as follows:
  When the request is made by a specific SM-DP+ 120
  When the request is made by the terminal 110 with a separate Indicator The one-time asymmetric key pair may be used for generating an encryption key between the SM-DP+ 120 and the eUICC 115 along with the one-time asymmetric key pair of the server 120. The encryption key may be generated as follows:
  The SM-DP+ 120 generates the encryption key by combining the one-time private key of the SM-DP+ 120 and the one-time private key of the eUICC 115.
  The eUICC generates the encryption key by combining the private key of the eUICC 115 and the public key of the SM-DP+ 120.

A factor that is additionally required for generating the encryption key may be transmitted from the SM-DP+ 120 to the eUICC 115 via the terminal 110.

The eUICC 115 may calculate an eUICC signature value (eUICC_Sign2) using the private key for signature (SK.eUCIC.ECDSA) of the eUICC 115 for the data including the one-time public key (otPK.EUICC.ECKA) of the generated one-time asymmetric key pair and the DP challenge. Since the DP challenge value generated by the SM-DP+ 120 is used in calculating the eUICC signature value, the SM-DP+ 120 may use the eUICC signature value for authenticating the eUICC 115 at a subsequent step. The eUICC_Sign2 makes it possible for the eUICC 115 to transmit the generated otPK.eUICC.ECKA value to the SM-DP+ 120 without any modification.

The eUICC 115 at step 737 may send the terminal 110 the one-time public key of the eUICC 115 and the eUICC signature value.

The terminal 110 may send the SM-DP+ 120 an ES9+GetBoundProfilePackage message at step 740. The ES9+GetBoundProfilePackage message may be the eUICCManagementRequest or ProfileRequest message.

The ES9+GetBoundProfilePackage message may include the one-time eUICC public key and the eUICC signature value. In addition, the ES9+GetBoundProfilePackage message may include the eUICC signature certificate (CERT.eUICC.ECDSA) for verifying the eUICC signature value and the EUM certificate (CERT.eUICC.ECDSA) for verifying the eUICC signature certificate.

In addition, the ES9+GetBoundProfilePackage message may include the information as follows for use as a mapping identifier in downloading a specific profile.

EventID
MatchingID
NotificationID
Activation Code Token

If the mapping identifier has been transmitted already at a previous step (e.g., step 720), it may be possible to omit transmitting the mapping identifier.

The terminal 110 may send the SM-DP+ 120 a Hashed Confirmation Code.

At step 745, the SM-DP+ 120 may verify the EUM certificate and the eUICC certificate as described in association with step 725.

The SM-DP+ 120 may verify the eUICC signature (eUICC Sign2) using the eUICC one-time public key received from the terminal 110 at step 740, the DP challenge value transmitted to the terminal 110 at step 727, and the public key included in the eUICC certificate. If the verification succeeds, this means that the SM-DP+ 120 has authenticated the eUICC 115. If the verification fails, the SM-DP+ 120 may stop the corresponding session and return an error message to the terminal 110.

The SM-DP+ 120 may map the profile to download using the EventID (or NotificationID, MatchingID, or Activation Code Token) value received at step 740. If there is no profile to download, the SM-DP+ 120 may return an error message to the terminal 110 and end the corresponding session.

The SM-DP+ 120 may generate a one-time asymmetric key pair. The one-time asymmetric key pair may be used for generating an authentication key between the eUICC 115 and the SM-DP+ 120.

The SM-DP+ 120 generates the encryption key by combining the one-time private key of the SM-DP+ 120 and the one-time private key of the eUICC 115.

The eUICC 115 generates the encryption key by combining the one-time private key of the eUICC 115 and the one-time public key of the SM-DP+ 120.

The SM-DP+ 120 may calculate an SM-DP+ signature value (DP signature2). The SM-DP+ signature value may be a calculated using the CRT, the one-time public key of the SM-DP+ 120, the one-time public key of the eUICC 115, and the SM-DP+ signature public key (SK.DP.ECDSA). The CRT may be used as a factor for generating the authentication key.

The SM-DP+ 120 may generate a profile package combined with a specific eUICC 115 (Bound Profile Package or BPP). The BPP may include the CRT, the one-time public key of the SM-DP+ 120, and the DP Signature2.

The BPP may include the ProfileInfo (or MetaData) encrypted with the encryption key.

The BPP may include an encrypted PPK generated by encrypting the Profile Protection Key with the encryption key.

The BPP may include Profile Package Blocks (PPBs) encrypted with the encryption key or the PPK. The encrypted PPBs may be generated by dividing the entire profile data by installable unit (Profile Element or PE) and encrypting the PPDs split by encryption-capable unit. The encryption may be performed using the SCP03t protocol.

Afterward, the SM-DP+ 120 may send the terminal 110 a BPP message at step 747 in response to the message received at step 740.

The terminal 110 may transmit the ES10b.LoadBoundProfilePackage message to the eUICC 115 multiple times at step 750 to deliver the ES8_InitializeSecureChannel information included in the BPP to the eUICC 115. The ES8_InitializeSecureChannel information may include the CRT, the one-time public key of the SM-DP+ 120, and the DP signature2. The ES8_InitializeSecureChannel may be the EstablishSecureChannel message. The ES10b.LoadBoundProfilePackage message may carry a StoreData command.

At step 753, the eUICC 115 may verify the DP signature (DP signature2) using the public key (PK.DP.ECDSA) of the DP signature certificate (CERT.DP.ECDSA) received at step 730, the CRT received at step 750, the one-time public key of the SM-DP+, and the one time public key of the eUICC which was received from the terminal 110 at step 737.

If the verification fails, the eUICC 115 may return an error message to the terminal 110 and end the procedure at step 755.

If the verification succeeds, the eUICC 115 may generate an encryption key using the CRT, the one-time private key of the eUICC 115, and the one-time public key of the SM-DP+ 120 and send the terminal 110 the encryption key at step 755.

The terminal 110 may transmit the ES10b.LoadBoundProfilePackage message multiple times to deliver the ES8+SetProfileInfo included in the BPP to the eUICC 115 at step 757. The ES8+SetProfileInfo may be called ES8+. StoreMetadata or InstallProfileRecord. The ES8+SetProfileInfo may include the ProfileInfo (or Metadata or ProfileRecord). The eUICC 115 may send the terminal 110 a response message at step 759.

If the BPP includes the ES8+ReplaceSessionKey, the terminal 110 may transmit the ES10b.LoadBoundProfilePackage message multiple times to deliver the ES8+ReplaceSessionKeys information include in the BPP to the eUICC 115. The ES8+ReplaceSessionKeys may be called ES8+ReplaceSessionKeys message.

The ES8+ReplaceSessionKeys may include the ProfileProtectionKey (PPK) encrypted with the encryption key of step 745.

At step 763, the eUICC 115 may send the terminal 110 a response message in reply to the message received at step 760.

Afterward, the terminal 110 may transmit the ES10b.LoadBoundProfilePackage message multiple times to deliver the encrypted profile package block (PPB) or profile segments included in the BPP.

The eUICC 115 may decrypt the Profile segments in series using the encryption key or PPK.

After processing all of the profile segments, the eUICC 115 may calculate the eUICC signature value and send the signature value to the terminal 110 at step 767. The terminal 110 may send the SM-DP+ 120 the corresponding eUICC signature value to inform of the profile installation result at step 770. The SM-DP+ 120 may send the terminal 110 a response message at step 775.

The information indicating whether a user's confirmation is required that is transmitted from the SM-DP+ 120 to the terminal 110 may be exemplarily formatted as follows.

```
UserConfirmation ::= SEQUENCE {
    confirmType              ConfirmType,
    confirmMessage ConfirmMessage    OPTIONAL
}
ConfirmType ::= ENUMERATED { yesOrNo (0), codeInput (1) }
ConfirmMessage ::= UTF8String
```

In the above example, the UserConfirmation data may be transmitted from the SM-DP+ 120 to the terminal 110 along with or without other data. The confirmType included in the UserConfirmation may have a value as follows:

If the confirmType is set to 0 indicating yesOrNo, the terminal 110 may opt for confirming or not confirming the profile download as described with reference to FIGS. 2 to 5 and 6A to 6C.

If the confirmType is set to 1, this means that the code input is required; thus, the terminal 110 asks for confirmation code input.

The confirmation message may be the supplementary information that the terminal 110 presents to the user and this message may be formatted differently depending on the operator.

Figure 8A:
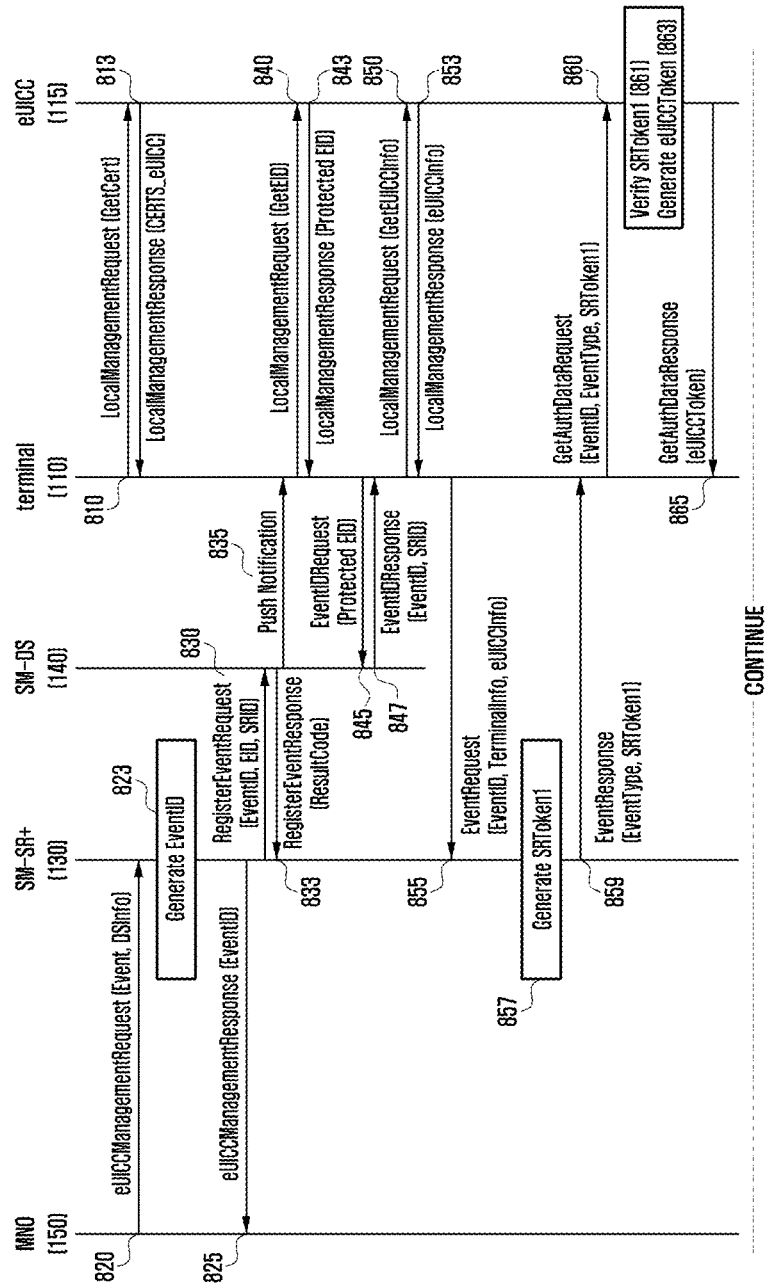
FIGS. 8A and 8B are a signal flow diagram illustrating a network initialization procedure according to an embodiment of the present invention.
Figure 8B:
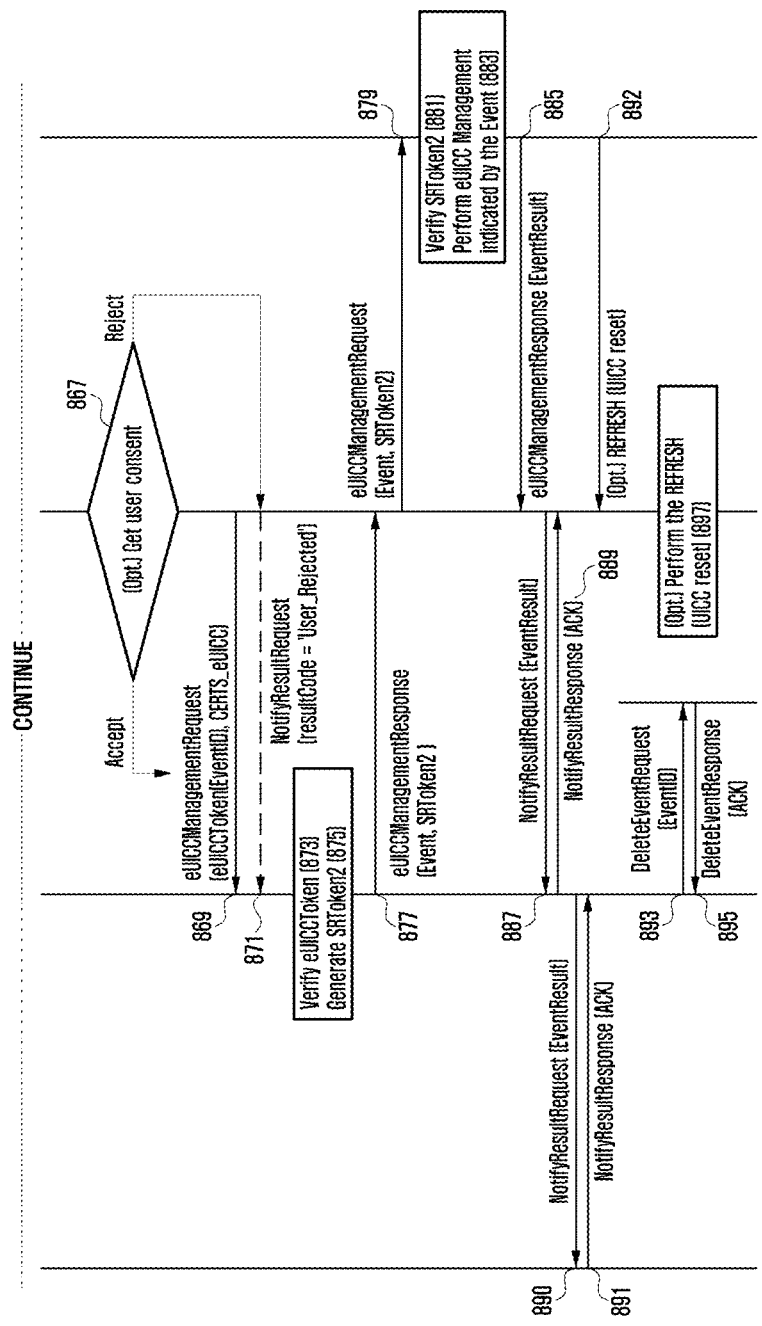

FIGS. 8A and 8B are a signal flow diagram illustrating a network initialization procedure according to an embodiment of the present invention.

If the eventType included in the eUICCManagementRequest message transmitted by the MO 150 is not set to "profileDownload", the radio management (remote management) may be performed in the ES5 security without involvement of the ES8. A detailed description thereof is made hereinafter.

The LPA (i.e., the terminal 110) may read the CERT-S_eUICC from the eUICC 115 at step 810. The CERT-S_eUICC may be the information including the eUICC certificate and the EUM certificate. In order to accomplish this, the terminal 110 may send the eUICC 115 a LocalManangementRequest message including the information (Get-Cert) requesting for the CERTS_eUICC at step 810 and receive a LocalManagementResponse message including the CERTS_eUICC from the eUICC 115 at step 813. If the terminal 110 has the CERTS_eUICC already, steps 810 and 813 may be omitted. Since these steps are identical with steps 611 and 612 of FIGS. 6A TO 6C, detailed descriptions thereof are omitted herein.

The MNO 820 may send the SM-SR+ 130 an ES4_eUICCManagementRequest message at step 820.

The ES4_eUICCManagementRequest message may include the information as follows:

| event  | Event,  |
|--------|---------|
| dsInfo | DSInfo  |

The Event has been described in the embodiment of FIGS. 6A TO 6C. The EventID of the ES4_eUICCManagementRequest message may be set to NULL.

At step 823, the SM-SR+ 130 may generate a globally unique EventID for the management event.

The SM-SR+ 130 may send the MNO 150 a eUICCManagementResponse message at step 825. The eUICCManagementResponse message may include the information as follows:

| resultCode | ResultCode, |
|------------|-------------|
| eventID    | EventID OPTIONAL |
| -- conditional if resultCode indicates Success | |

The SM-SR+ 130 may register the Event with the SM-DS 140 using the ES12_RegisterEventRequest and ES12_RegisterEventResponse messages through steps 830 and 833. The ES12_RegisterEventRequest and ES12_RegisterEventResponse messages may be identical with those described in association with steps 621 and 622 of FIGS. 6A TO 6C; thus, detailed descriptions thereof are omitted herein.

The SM-DS 140 may send the terminal 110 a push notification message via a push server.

The terminal 110 may read the ProtectedEID value from the eUICC 115 through steps 840 and 843. The ProtectedEID may be used later at step 845. If the terminal 110 knows the ProtectedEID value, it may omit steps 840 and 843. The terminal 110 may perform these steps before steps 810 and 813. Since these steps are identical with steps 613 and 614 described in the embodiment of FIGS. 6A TO 6C, detailed descriptions thereof are omitted herein.

The terminal 110 may send the SM-DS 140 an EventIDRequest message at step 845.

The EventIDRequest message may include the information as follows:

| protectedEID | ProtectedEID |
|--------------|--------------|

Then, the SM-DS 140 may verify the ProtectedEID. If the time interval between the time point included in the protected EID and the time point when the EventID request message is received is greater than a predetermined range, the SM-DS 140 may fail in verifying the protected EID. Since the step is identical with step 624 described in the embodiment of FIGS. 6A TO 6C, a detailed description thereof is omitted herein.

Next, the SM-DS 140 may send the terminal 110 an ES11_EventIDResponse message.

The ES11_EventIDResponse message may include the information as follows:

| resultCode  | ResultCode, |
|-------------|-------------|
| eventIDList | SEQUENCE OF PendingEvent -- conditional if resultCode indicates success |

The PendingEvent may include the information as follows:

| eventID | EventID, |
|---------|----------|
| srID    | SRID     |

When the terminal 110 requests to the SM-DS 140 for the EventID, the SM-DS 140 may have at least one PendingEvent. In this case, the eventIDList may include one or more PendingEventIDs. Then the terminal 110 may process the PendingEvents one by one in the order as arranged in the eventIDList.

The terminal 110 may receive the eUICCInfo from the eUICC 115 through steps 850 and 853. The eUICCInfo may be used later at step 855. If the terminal 110 already has the eUICCInfo, steps 850 and 853 may be omitted. The terminal 110 may perform these steps prior to steps 810 and 813 or steps 840 or 843. Since these steps are identical with steps 615 and 616 described in the embodiment of FIGS. 6A TO 6C, detailed descriptions thereof are omitted herein.

If the EventIDResponse message including at least one PendingEvent is received, the terminal 110 may send the SM-SR+ 130 an EventRequest message at step 855.

The EventRequest message may include the information as follows:

| eventID | EventID, |
| terminalInfo | TerminalInfo, |
| eUICCInfo | EUICCInfo |

If the SM-SR+ 130 does not support the received eUIC-CInfo.ECCParameter, it may send the terminal 110 a failure message.

The SM-SR+ 130 may generate an SRToken1 at step 857.
At this time, the SRToken1 may include the information as follows:

| cert_SR_ECDSA | CERT_ECDSA, |
| nonce_SR | NONCE_SR, |
| sign_SR1 | SIGN_ECDSA |

The cert_SR_ECDSA may comply with the ECC Parameter received at step 855.

The sign_SR1 may is a signature generated by the SM-SR+ 130 using the SK_SR_ECDSA.

The SM-SR+ 130 may store the NONCE_SR along with the eventID and use the NONCE_SR later at step 873 for authentication of the eUICC 115.

The SM-SR+ 130 may send the terminal 110 an EventResponse message at step 859.

The EventResponse message may include the information as follows:

| resultCode | ResultCode, |
| eventType | EventType, |
| srToken1 | SRToken1 |

The terminal 110 may send the eUICC 115 an ES10_GetAuthDataRequest message at step 860. Since this step is identical with step 639 described in the embodiment of FIGS. 6A TO 6C, a detailed description thereof is omitted.

The eUICC 115 may verify the srToken1 at step 861.
At this time, the verification process may be performed as follows. The eUICC 115 may verify the CERT_SR_ECDSA using the PK_CI_ECDSA. The eUICC 115 may extract the PK_SR_ECDSA from the CERT_SR_ECDSA and verify the sign_SR1 with the PK_SR_ECDSA. The eUICC 115 may store the PK_SR_ECDSA for use later.

The eUICC 115 may verify whether the SRID included in the CERT_SR_ECDSA is performed in compliance with the EPRServerAccessControl.

If the eventType is set to enableProfile (1), disableProfile (2), deleteProfile (3), getProfileRegistry (4), or updateProfileRegistry (5), the eUICC 1150 may verify whether the SRID included in the CERT_SR_ECDSA is included in the authorizedSR of the ProfileRecord of the profile.

If the eventType is set to getEPR (6) or updateEPR (7), the eUICC 115 may verify whether the SRID included in the CERT_SR_ECDSA is included in the authorized SR of the EPR.

If the eventType is set to getDSInfo (8) or updateDSIfo (9), the eUICC 115 may verify whether the SRID included in the CERT_SR_ECDSA is included in the authorizedSR of the DSINfoStatic.

If the eventType is set to getCIInfo (10) or updateCIInfo (11), the eUICC 115 may verify whether the SRIC included in the CERT_SR_ECDSA is included in the authorizedSR of the CIInfo.

If the eventType is set to getFirmwareInfo (12) or updateFirmwareInfo (13), the eUICC 115 may verify whether the SRID included in the CERT_SR_ECDSA is included in the authorizedSR of the FirmwareInfo.

The eUICC 115 may generate an eUICCToken at step 863.

The eUICCToken may include the information as follows:

| eventID | EventID, |
| sign_eUICC | SIGN_ECDSA, |
| nonce_eUICC | NONCE_eUICC |
| OPTIONAL | |

The eUICC signature sign_eUICC may be calculated with the SK_eUICC_ECDSA. Since this step is identical with step 644 described in the embodiment of FIGS. 6A TO 6C, a detailed description thereof is omitted herein.

The eUICC 115 may send the terminal 110 an ES10_GetAuthDataResponse message at step 865.

The ES10_GetAuthDataResponse message may include the information as follows:

| resultCode | ResultCode, |
| eUICCToken | EUICCToken |

Step 867 is an optional step in which the terminal 110 may ask the user for consent.

If the user consents to the event or the user's consent is not required, the terminal 110 may send the SM-SR+ 130 an ES9_eUICCManagementRequest message at step 869.

At this time, the ES9_eUICCManagementRequest message may include the information as follows:

| eUICCToken | EUICCToken, |
| certs_eUICC | CERTS_eUICC |

Otherwise, if the user rejects the event, the terminal 110 may send the SM-SR+ 130 an ES9_NotifyResultRequest message at step 871. The ES9_NotifyResultRequest message may include an eventID corresponding to the resultCode of the "3200 User_Rejected". Since this step is identical with step 670 described in the embodiment of FIGS. 6A TO 6C, a detailed description thereof is omitted.

The SM-SR+ 130 may verify the eUICCToken at step 873.

The verification process may be performed as follows:
The SM-SR+ 130 may verify the CERT_eUICC_ECDSA with the CERT_CI_ECDSA stored in the SM-SR+ 130 and the CERT_EUM_ECDSA received from the terminal 110.

Afterward, the SM-SR+ 130 may extract the PK_eUICC_ECDSA from the CERT_eUICC_ECDSA and verify the sign_eUICC with the PK_eUICC_ECDSA. Since this step is identical with step 648 described in the embodiment of FIGS. 6A TO 6C, a detailed description thereof is omitted.

The SM-SR+ 130 may verify the sign_eUICC using the NONCE_SR stored along with the eventID at step 857.

If any of the verifications fails, the SM-SR+ 130 may return an error message to the terminal 110 and/or the MNO 150.

If all of the verifications succeed, this may mean that the SM-SR+ 130 has authenticated the eUICC 115 successfully.

The SM-SR+ 130 may generate an srToken2 at step 875.

At this time, the srToken2 may include the information as follows:

| sign_SR2 | SIGN_ECDSA |
|---|---|

The signature sign_SR2 may be calculated with the SK_SR_ECDSA. Since this step is identical with step 655 described in the embodiment of FIGS. 6A TO 6C, a detailed description thereof is omitted herein.

The SM-SR+ 130 may send the terminal 110 an ES9_eUICCManagementResponse message at step 877.

The ES9_eUICCManagementResponse message may include the information as follows:

```
    resultCode         ResultCode,
    event              Event           OPTIONAL, /*
conditional if eventType != downloadProfile (0) */
    profileInstallPackage  ProfileInstallPackage  /* conditional
                       OPTIONAL,
if eventType = downloadProfile (0) */
    srToken2           SRToken2
```

The terminal 110 may send the eUICC 115 an eUICC-ManagementRequest message at step 879. The eUICCManagementRequest message may include the event information and srToken2.

The eUICC 115 may verify the srToKen2 at step 881.

The verification process may be performed as follows: the eUICC 115 may verify the sign_SR2 with the PK_S-R_ECDSA. Since this step is identical with step 658 described in the embodiment of FIG. 6, a detailed description thereof is omitted.

The eUICC 115 may verify the sign_SR2 using the PK_SR_ECDSA and NONCE_eUICC values stored at steps 861 and 863 along with the eventID.

If the eventType is set to "updateCIInfo (11)" and the CIInfo includes a new CI certificate, the eUICC 115 may check the signature of the certificate with the PK_CI_ECDSA contained in the same certificate to verify the CI certificate.

If the eventType is set to "updateFirmwareInfo (13)", the eUICC 115 may verify the sign EUM in the FirmwareInfo.

If any of the verifications fails, the eUICC 115 may return an error message to the terminal 110.

If all of the verifications succeed, this may mean that the eUICC 115 has authenticated the SM-SR+ 130 successfully.

If the srToken1 is verified successfully. The eUICC 115 may acquire some valuable verified information, e.g., SRID for EventType, Target EID, EventID, EventType, and other parameters.

Using such information, the eUICC 115 may refer to eUICC Policy Rules (e.g., server access control and subsidy lock), profile policy rules, and other necessary rules). The eUICC may check whether the event fulfills all of the rules configured in the eUICC 115.

If the event does not fulfill the above rules, the eUICC 115 may reject the event and transmit a reject cause.

If the verification fails at step 881, the eUICC 115 may perform eUICC management indicated by means of the event. The eUICC 115 may perform the eUICC management according to the eventType of the event.

For example, the eventType may be the Update CIInfo.

The network may initiate update of the CIInfo (certificate issuer information) stored in the eUICC 115.

The eUICC 115 may update its CIList (certificate issuer list). If the ES10_eUICCManagementRequest.event.eventType is set to "updateCIInfo (11)", the eUICC may update the allowed SM-SR+ information defined in the CIInfo according to the ES10_eUICCManagementRequest.event.CIInfo. The allowed SM-SR+ information may include the information on the server (SM-SR+) that is capable of updating the eUICC 115 in order to allow a specific authorized server to update the eUICC 115. The eUICC 115 may retain the allowed SM-SR+ information to compare the information with the server identity information being received in order to allow, only when they match, for update of the profile of the eUICC.

If the SRID of the SM-SR+ 130 is not included in the CIInfo.authorizedSR of the eUICC 115, the eUICC 115 may omit updating the CIInfo and return an error message including the information indicating "SRID Not Allowed".

Afterward, the eUICC 115 may send the terminal 110 an ES10_eUICCManagementResponse message at step 885. The ES10_eUICCManagementResponse message may include an event result information.

The terminal 110 may send the SM-SR+ 130 an ES9_NotifyResultRequest message at step 887, and the SM-SR+ 130 may send the terminal 110 an ES9_NotifyResultResponse message in reply thereto. Since these steps are identical with steps 670 and 671 described in the embodiment of FIGS. 6A to 6C, detailed descriptions thereof are omitted herein.

Step 892 is an optional step in which, if the entType is set to "enableProfile (1)" or "disableProfile (2)", the eUICC 115 may send the terminal 110 a terminal refresh (Terminal REFRESH) message (UICC reset).

If the eventType is set to "enableProfile (1)" and the ES10_eUICCManagementResponse message indicates that the profile has been enabled successfully, the terminal 110 may perform a REFRESH (UICC reset) operation to disconnect from the current network and reconnect to a new MNO network using the enable profile. (The terminal 110 may send the SM-SR+ 130 a result notification successfully and perform the REFRESH operation by itself without receipt of the REFRESH proactive command from the eUICC 115. Accordingly, the eUICC 115 may not transmit the REFRESH command to the terminal 110 even after enabling the profile.)

The SM-SR+ 130 may send the MNO 150 an ES4_NotifyResultRequest message at step 890. The ES4_NotifyResultRequest may include the eventResult generated by the eUICC 115, and the eventResult may indicate the result of the management event initiated by the eUICC 115. The EUM certificate and CERT_EUM_ECDSA transmitted along with the eventResult may be the certificates chained up to the CI certificate stored by the MNO 150 for use by the MNO 150 in verifying the eUICC signature. Since the ES4_NotifyResultRequest message was described in association with steps 670 and 683 of FIG. 6, a detailed description thereof is omitted herein.

Afterward, the MNO 150 may reply with the next TLV at step 891. If the MNO 150 is not aware of the eventID in the eventResult, the MNO 150 may send the SM-SR+ 130 a failure message including the resultCode.

The ES4_NotifyResultResponse message transmitted from the MNO 150 to the SM-SR+ 130 may include the information as follows:

| resultCode | ResultCode |
|---|---|

If the ES9_NotifyResultRequest message transmitted by the terminal 110 indicates successful completion of the event, the SM-SR+ 130 may send the SM-DS 140 an ES12_DeleteEventRequest message including the EventID. Then the SM-DS 140 may delete the EventID and related parameters stored at step 830 from its database.

The ES12_DeleteEventRequest message may include the information as follows:

| eventID | EventID |
|---|---|

Next, the SM-DS 140 may reply with the next TLV at step 895. If the SM-DS 140 is not aware of the eventID included in the ES12_DeleteEventRequest message, the SM-DS 140 may send the SM-SR+ 130 a failure message including the resultCode.

Meanwhile, the ES12_DeleteEventResponse message as a response message transmitted from the SM-DS 140 to the SM-SR+ 130 may include the information as follows:

| resultCode | ResultCode |
|---|---|

Figure 9:
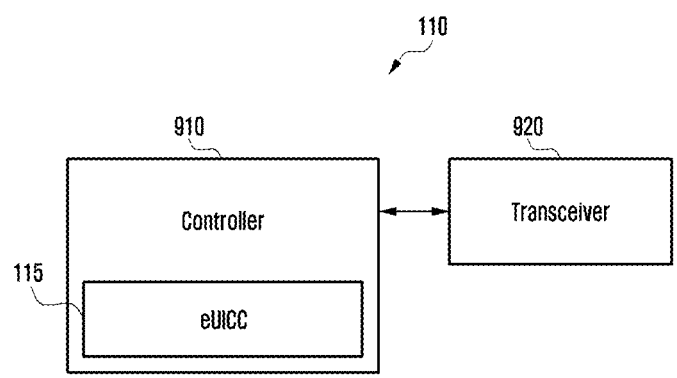
FIG. 9 is a block diagram illustrating a configuration of a terminal according to an embodiment of the present invention.

FIG. 9 is a block diagram illustrating a configuration of a terminal according to an embodiment of the present invention.

In reference to FIG. 9, the terminal 110 according to an embodiment of the present invention may include a transceiver 920 and a control unit 910 for controlling overall operations of the terminal 110. The terminal 110 may further include an eUICC 115. The eUICC 115 may be included in the control unit 910 as depicted in the drawing or implemented as a component separated from the control unit 910. The eUICC 115 may be implemented as a network entity separated from the terminal 110.

The control unit 910 controls the terminal 110 to perform the operations of one of the above-described embodiments. For example, the control unit 910 may control the terminal 110 to transmit a first message including the information on the profile to receive from the profile provision server 120; receive a second message including the information indicating whether a user's encryption code input is required and the a first modified encryption code from the profile provision server 120; generate, when the first modified encryption code is authenticated successfully, a second modified encryption code; transmit to the profile provision server 120 a third message including the second modified encryption code and the information requesting for profile download; and receive a fourth message including the information on the profile from the profile provision server 120.

The transceiver 920 of the terminal 110 may transmit/receive signals according to the operations of one of the above-described embodiments. For example, the transceiver 920 of the terminal 110 may transmit to the server 120 the first message including the information on the profile. The transceiver 920 may also receive the fourth message including the information on the profile from the profile provision server 120.

Figure 10:
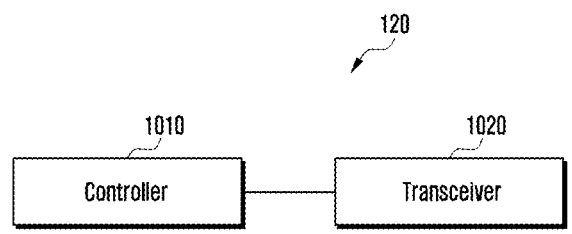
FIG. 10 is a block diagram illustrating a configuration of an SM-DP+ according to an embodiment of the present invention.

FIG. 10 is a block diagram illustrating a configuration of an SM-DP+ according to an embodiment of the present invention.

In reference to FIG. 10, the SM-DP+ 120 according to an embodiment of the present invention may include a transceiver 1020 and a control unit 1010 for controlling overall operations of the SM-DP+ 120.

The control unit 1010 controls the SM-DP+ 120 to perform the operations of one of the above-described embodiments. For example, the control unit 1010 of the SM-DP+ 120 may control the SM-DP+ 120 to receive a first message including the information on the profile to receive from a terminal 110; generate a first modified encryption code for authenticating a profile provision server; transmit a second message including the information indicating whether a user's encryption code input is required and the first modified encryption code; receive a third message including the second modified encryption code and the information requesting for profile download from the terminal 110; and transmit, when the second modified encryption code is authenticated successfully, a fourth message including the information on the profile.

The transceiver 1020 of the SM-DP+ 120 may transmit/receive signals according to operation of one of the above-described embodiments. For example, the transceiver 1202 of the SM-DP+ 120 may receive a message including the information on the profile to receive and provide the terminal 110 with the corresponding profile.

Figure 11:
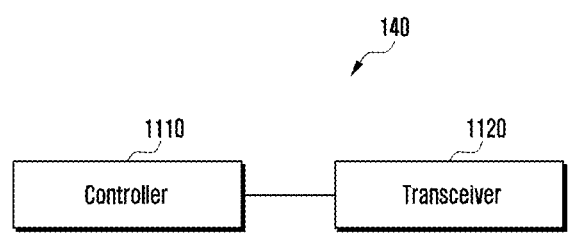
FIG. 11 is a block diagram illustrating a configuration of an SM-SR+ according to an embodiment of the present invention.

FIG. 11 is a block diagram illustrating a configuration of an SM-SR+ according to an embodiment of the present invention.

In reference to FIG. 11, the SM-SR+ 130 according to an embodiment of the present invention may include a transceiver 1120 and a control unit 1110 for controlling overall operations of the SM-SR+ 130.

The control unit 1110 controls the SM-SR+ 130 to perform the operations of one of the above-described embodiments. For example, the control unit 1110 may control the SM-SR+ 130 to transmit a message including the information requesting for profile download or profile management.

The transceiver 1120 of the SM-SR+ 130 may transmit/receive signals according to the operations of one of the above-described embodiments. For example, the transceiver 1120 may transmit a message including the information requesting for profile download or profile management.

Figure 12:
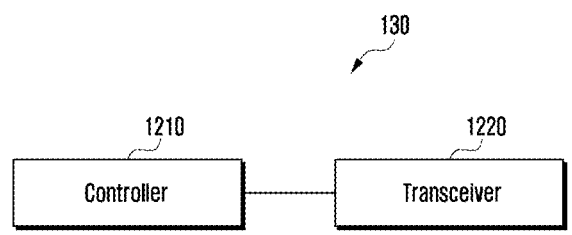
FIG. 12 is a block diagram illustrating a configuration of an SM-DP according to an embodiment of the present invention.

FIG. 12 is a block diagram illustrating a configuration of an SM-DP according to an embodiment of the present invention.

In reference to FIG. 12, the SM-DS 140 according to an embodiment of the present invention may include a transceiver 1220 and a control unit 1210 for controlling overall operations of the SM-DS 140.

The control unit 1210 controls the SM-DS 140 to perform the operations according to one of the above-described embodiments. For example, the control unit 1210 may control the SM-DS 140 to receive a message including the information requesting for profile download or profile management from the SM-SR+ 130.

The transceiver 1220 of the SM-DS 140 may transmit/receive signals according to the operations of one of the above-described embodiments. For example, the transceiver 1220 may receive a message including the information requesting for profile download or profile management from the SM-SR+ 130.

As described above, the communication system of the present invention is advantageous in terms of reducing waste of a number of resources such as profile and IMSI stored in the profile by blocking download of unwanted profiles or unencrypted profiles that will not be used in such a way that unencrypted profile information is transmitted before transmitting the encrypted profile to a terminal in order for the user to determine whether to use the profile in a procedure of downloading and installing the profile in the terminal.

The communication system of the present invention is advantageous in terms of preventing a profile from being abnormally installed and reducing waste of a number of resources such as profile and IMSI stored in the profile by blocking download of unwanted profiles or unencrypted profiles that will not be used in such a way that the operator asks the user for a confirmation code transmitted in a separate method before an encrypted profile is transmitted to the terminal in the procedure of downloading and installing the profile in the terminal and transmits the encrypted profile to the terminal only when the confirmation code input by the user is verified.

Although various embodiments of the present invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method performed by a terminal, the method comprising:
   transmitting, to a profile provision server, a first message including a first challenge value for authentication of the profile provision server;
   receiving, from the profile provision server, a second message including a first data and a first signature value computed over the first data as a response to the first message, wherein the first data includes the first challenge value and a second challenge value for authentication associated with the terminal;
   transmitting, to the profile provision server, a third message including a second data and a second signature value computed over the second data, which are generated after the first signature value is verified, wherein the second data includes the second challenge value and profile mapping information;
   receiving, from the profile provision server, a fourth message including unencrypted information related to a profile and information indicating whether a confirmation code is required for the profile as a response to the third message;
   receiving, via a user interface, a confirmation code in case that the information indicates the confirmation code is required;
   transmitting, to the profile provision server, a fifth message for requesting a profile data, the fifth message including a hashed confirmation code which is calculated based on the confirmation code; and
   receiving, from the profile provision server, a sixth message including an encrypted profile data as a response to the fifth message.

2. The method of claim 1, wherein the fifth message includes a third data and a third signature value computed over the third data, and
   wherein the third data includes the hashed confirmation code.

3. The method of claim 1, wherein the receiving the fourth message comprises:
   receiving, from the profile provision server, the fourth message including the unencrypted information related to the profile, a fourth data, and a fourth signature value computed over the fourth data and the second signature value, wherein the fourth data includes the information indicating whether the confirmation code is required.

4. The method of claim 1, wherein the receiving the confirmation code further comprises:
   displaying information requesting a user to enter the confirmation code and profile information contained in the unencrypted information related to the profile.

5. The method of claim 1, further comprising:
   receiving, via the user interface, information indicating that a user rejects a download of the profile; and
   transmitting, to the profile provision server, the information indicating that the user rejects a download of the profile.

6. A method performed by a profile provision server, the method comprising:
   receiving, from a terminal, a first message including a first challenge value for authentication of the profile provision server;
   generating a first data including the first challenge value and a second challenge value for authentication associated with the terminal, and computing a first signature value over the first data;
   transmitting, to the terminal, a second message including the first data and the first signature value as a response to the first message;
   receiving, from the terminal, a third message including a second data and a second signature value computed over the second data, wherein the second data includes the second challenge value and profile mapping information;
   verifying the second signature value;
   determining whether a confirmation code is required for a profile verified by the profile mapping information;
   transmitting, to the terminal, a fourth message including unencrypted information related to the profile and information indicating whether the confirmation code is required for the profile as a response to the third message;
   receiving, from the terminal, a fifth message for requesting a profile data, the fifth message including a hashed confirmation code which is calculated based on the confirmation code, in case that the information indicates the confirmation code is required; and
   transmitting, to the terminal, a sixth message including an encrypted profile data as a response to the fifth message.

7. The method of claim 6, wherein the receiving the fifth message comprises:
   receiving, from the terminal, the fifth message including a third data and a third signature value computed over the third data, wherein the third data includes the hashed confirmation code calculated based on the confirmation code.

8. The method of claim 6, wherein the receiving the fifth message comprises:

receiving, from the terminal, the fifth message including the hashed confirmation code calculated based on the confirmation code;

calculating an expected hash value using a soured hashed confirmation code;

verifying that the received hashed confirmation code matches the expected hash value; and generating the sixth message including the encrypted profile data in case that the received hashed confirmation code matches the expected hash value.

9. The method of claim 6, wherein the transmitting the fourth message comprises:

transmitting, to the terminal, the fourth message including the unencrypted information related to the profile, a fourth data, and a fourth signature value computed over the fourth data and the second signature value, wherein the fourth data includes the information indicating whether the confirmation code is required.

10. The method of claim 6, further comprising:

receiving, from the terminal, information indicating that a user rejects a download of the profile.

11. A terminal comprising:

a transceiver; and a controller configured to:
transmit, to a profile provision server via the transceiver, a first message including a first challenge value for authentication of the profile provision server,
receive, from the profile provision server via the transceiver, a second message including a first data and a first signature value computed over the first data as a response to the first message, wherein the first data includes the first challenge value and a second challenge value for authentication associated with the terminal,
transmit, to the profile provision server via the transceiver, a third message including a second data and a second signature value computed over the second data, which are generated after the first signature value is verified, wherein the second data includes the second challenge value and profile mapping information,
receive, from the profile provision server via the transceiver, a fourth message including unencrypted information related to a profile and information indicating whether a confirmation code is required for the profile as a response to the third message,
receive, via a user interface, a confirmation code in case that the information indicates the confirmation code is required,
transmit, to the profile provision server via the transceiver, a fifth message for requesting a profile data, the fifth message including a hashed confirmation code which is calculated based on the confirmation code, and
receive, from the profile provision server via the transceiver, a sixth message including an encrypted profile data as a response to the fifth message.

12. The terminal of claim 11, wherein the fifth message includes a third data and a third signature value computed over the third data, and
wherein the third data includes the hashed confirmation code.

13. The terminal of claim 11, wherein the controller is further configured to:

receive, from the profile provision server via the transceiver, the fourth message including the unencrypted information related to the profile, a fourth data, and a fourth signature value computed over the fourth data and the second signature value, wherein the fourth data includes the information indicating whether the confirmation code is required.

14. The terminal of claim 11, wherein the controller is further configured to:

display information requesting a user to enter the confirmation code and profile information contained in the unencrypted information related to the profile.

15. The terminal of claim 11, wherein the controller is further configured to:

receive, via the user interface, information indicating that a user rejects a download of the profile, and transmit, to the profile provision server via the transceiver, the information indicating that the user rejects a download of the profile.

16. A profile provision server comprising:

a transceiver; and a controller configured to:
receive, from a terminal via the transceiver, a first message including a first challenge value for authentication of the profile provision server,
generate a first data including the first challenge value and a second challenge value for authentication associated with the terminal, and computing a first signature value over the first data,
transmit, to the terminal via the transceiver, a second message including the first data and the first signature value as a response to the first message,
receive, from the terminal via the transceiver, a third message including a second data and a second signature value computed over the second data, wherein the second data includes the second challenge value and profile mapping information,
verify the second signature value,
determine whether a confirmation code is required for a profile verified by the profile mapping information,
transmit, to the terminal via the transceiver, a fourth message including unencrypted information related to the profile and information indicating whether the confirmation code is required for the profile as a response to the third message,
receive, from the terminal via the transceiver, a fifth message for requesting a profile data, the fifth message including a hashed confirmation code which is calculated based on the confirmation code, in case that the information indicates the confirmation code is required, and
transmit, to the terminal via the transceiver, a sixth message including an encrypted profile data as a response to the fifth message.

17. The profile provisioning server of claim 16, wherein the controller is further configured to:

receive, from the terminal via the transceiver, the fifth message including a third data and a third signature value computed over the third data, wherein the third data includes the hashed confirmation code calculated based on the confirmation code.

18. The profile provision server of claim 16, wherein the controller is further configured to:

receive, from the terminal via the transceiver, the fifth message including the hashed confirmation code calculated based on the confirmation code, calculate an expected hash value using a soured hashed confirmation code, verify that the received hashed confirmation code matches the expected hash value, and generate the sixth message including the encrypted profile data in case that the received hashed confirmation code matches the expected hash value.

19. The profile provision server of claim 16, wherein the controller is further configured to:

transmit, to the terminal via the transceiver, the fourth message including the unencrypted information related to the profile, a fourth data, and a fourth signature value computed over the fourth data and the second signature value, wherein the fourth data includes the information indicating whether the confirmation code is required.

20. The profile provision server of claim 16, wherein the controller is further configured to:

receive, from the terminal via the transceiver, information indicating that a user rejects a download of the profile.

* * * * *